(12) United States Patent
Yui et al.

(10) Patent No.: US 10,470,607 B2
(45) Date of Patent: *Nov. 12, 2019

(54) BOTTLED WATER DISPENSERS WITH SINGLE-SERVE COFFEE BREWING FEATURES

(71) Applicants: George Yui, Toronto (CA); Andrei Yui, Toronto (CA)

(72) Inventors: George Yui, Toronto (CA); Andrei Yui, Toronto (CA)

( * ) Notice: Subject to any disclaimer, the term of this patent is extended or adjusted under 35 U.S.C. 154(b) by 441 days.

This patent is subject to a terminal disclaimer.

(21) Appl. No.: 15/225,735

(22) Filed: Aug. 1, 2016

(65) Prior Publication Data
US 2016/0338528 A1 Nov. 24, 2016

Related U.S. Application Data

(63) Continuation of application No. 14/997,558, filed on Jan. 17, 2016, now abandoned, which is a continuation of application No. 14/011,689, filed on Aug. 27, 2013, now Pat. No. 9,271,603, which is a continuation-in-part of application No. 13/751,996, filed on Jan. 28, 2013, now abandoned.

(51) Int. Cl.
| | |
|---|---|
| *A47J 31/46* | (2006.01) |
| *A47J 31/40* | (2006.01) |
| *B67D 3/00* | (2006.01) |
| *A47J 31/36* | (2006.01) |

(52) U.S. Cl.
CPC ......... *A47J 31/465* (2013.01); *A47J 31/3628* (2013.01); *A47J 31/3695* (2013.01); *A47J 31/407* (2013.01); *B67D 3/0009* (2013.01); *B67D 3/0019* (2013.01)

(58) Field of Classification Search
CPC .... A47J 31/465; A47J 31/407; A47J 31/3628; A47J 31/3695; B67D 3/0019
USPC ..... 99/280, 288, 295; 222/54, 66, 67, 129.2, 222/146.1
See application file for complete search history.

(56) References Cited

U.S. PATENT DOCUMENTS

| | | | | |
|---|---|---|---|---|
| 4,305,328 A | * | 12/1981 | Kueser | .................... A47J 31/32 99/283 |
| 4,841,849 A | * | 6/1989 | Shimomura | .......... A47J 31/047 99/282 |
| 2004/0112917 A1 | * | 6/2004 | Groesbeck | ........... B67D 1/0021 222/105 |
| 2005/0150390 A1 | * | 7/2005 | Schifferle | .......... B65D 85/8043 99/295 |

(Continued)

*Primary Examiner* — Thien S Tran

(57) ABSTRACT

Combined water dispensers and coffee making devices are disclosed, which include a cabinet configured to house a water bottle in a bottom half of the interior portion of the cabinet; a cold tank that is configured to receive water from the water bottle, which is connected to an evaporator; one or more hot tanks that are configured to receive water (directly or indirectly) from the cold tank, which are connected to a heating coil to heat the water that is contained therein; and a coffee making device located on a top side of the cabinet. The coffee making device receives water from the hot tank, receives a disposable cartridge that contains coffee grinds for a single-serving of coffee, causes water to contact the coffee grinds to produce a coffee beverage, and employs a set of spikes to make water entry and exit apertures in the cartridge.

9 Claims, 47 Drawing Sheets

(56) References Cited

U.S. PATENT DOCUMENTS

| | | | |
|---|---|---|---|
| 2005/0188855 A1* | 9/2005 | Tang | A47J 31/106 99/279 |
| 2006/0096465 A1* | 5/2006 | Hu | A47J 31/002 99/280 |
| 2008/0282897 A1* | 11/2008 | Webster | A47J 31/56 99/280 |
| 2009/0017177 A1* | 1/2009 | Yoakim | A47J 31/0678 426/431 |
| 2009/0126577 A1* | 5/2009 | Ternite | A47J 31/0673 99/295 |
| 2010/0252570 A1* | 10/2010 | Yui | B67D 1/0004 222/67 |
| 2011/0259913 A1* | 10/2011 | Yui | B67D 1/0004 222/66 |
| 2013/0239817 A1* | 9/2013 | Starr | A47J 31/462 99/280 |

\* cited by examiner

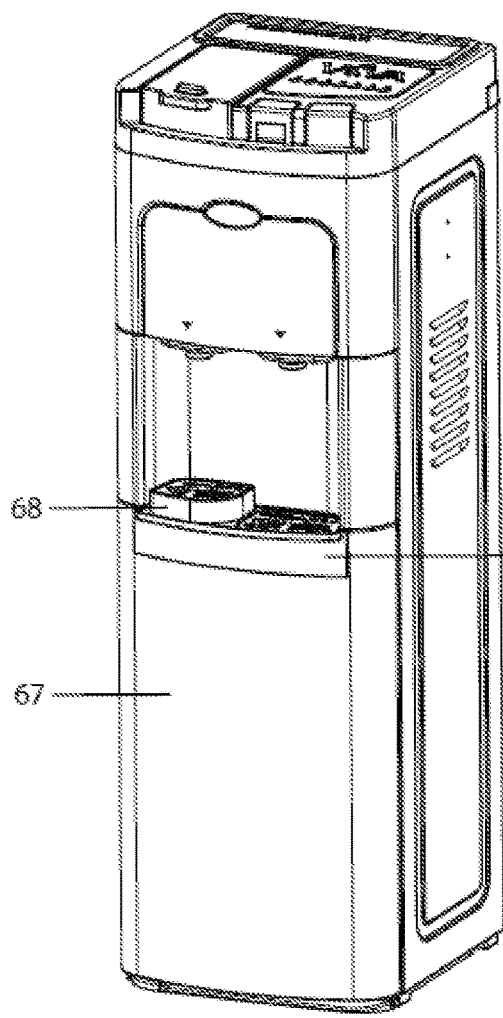 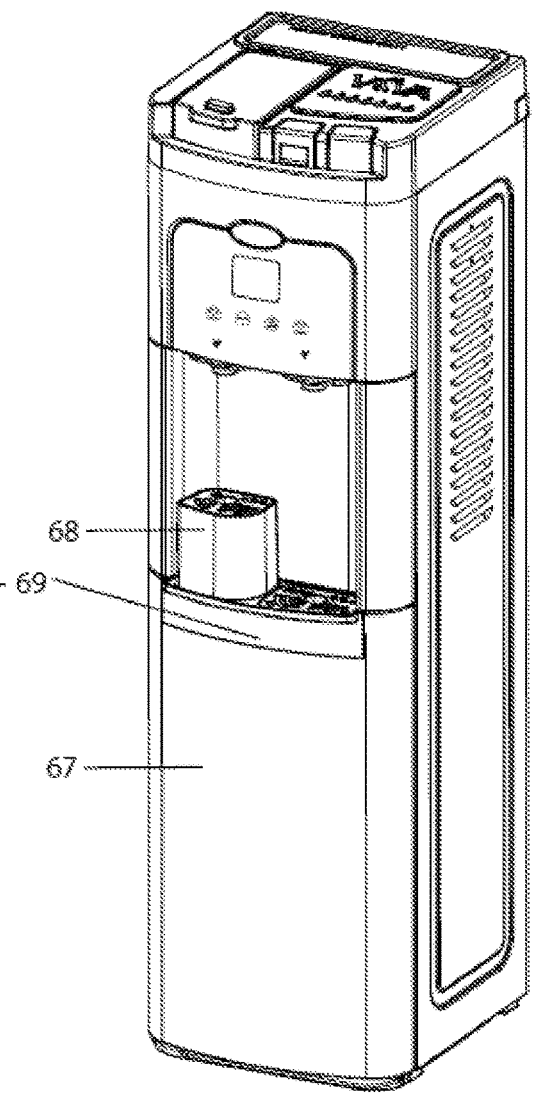
Figure 23A                    Figure 23B

BOTTLED WATER DISPENSERS WITH SINGLE-SERVE COFFEE BREWING FEATURES

CROSS-REFERENCE TO RELATED APPLICATIONS

This is a continuation of U.S. patent application Ser. No. 14/997,558, filed Jan. 17, 2016, which is a continuation of U.S. patent application Ser. No. 14/011,689 (now U.S. Pat. No. 9,271,603), filed Aug. 27, 2013, which is a continuation-in-part application of U.S. patent application Ser. No. 13/751,996, filed on Jan. 28, 2013.

FIELD OF THE INVENTION

The present invention relates generally to the field of bottled water dispensers and coffee brewing devices and, more particularly, to combination devices that include bottled water dispensing features and coffee brewing devices.

BACKGROUND OF THE INVENTION

The demand for clean and healthy drinking water is increasing dramatically, which is being driven by the rapid growth in population and standards of living across the globe. This demand has translated into a continuing need for safe, clean, and easy to use water dispensers, including for both hot and cold water. In addition, both residential homes and commercial offices will typically have at least one coffee brewing device. Indeed, coffee is among the most frequently-consumed beverages in the world. Since bottled water dispensers often include a source of clean and consumable drinking water, it would be advantageous to combine and integrate the features and functionalities of bottled water dispensers, including for both hot and cold water, and coffee brewing devices (and, particularly, single-serve coffee brewing devices). Furthermore, it would be desirable to provide a product, which combines hot/cold water dispensing features and coffee brewing devices, and is able to produce a single-serve coffee beverage quickly and with consistent quality.

As the following will demonstrate, many of the foregoing needs are addressed by the present invention.

SUMMARY OF THE INVENTION

According to certain aspects of the invention, a combined bottom-loading bottled water dispenser and coffee making device is provided, which includes an exterior cabinet; an interior space that is configured to house a water bottle within the bottom half of the dispenser; a cold water tank and means for dispensing cold water from such tank; a first hot water tank and means for dispensing water from such tank; and a second hot water tank that is configured to deliver hot water to a coffee making device (with the second hot water tank being configured to receive water from the first hot water tank). The water dispenser further includes one or more flow sensors, which monitor the flow of water into, and volumes of water contained within, the cold and hot water tanks described herein. The invention provides that the coffee making device is integrated into the water dispenser and, preferably, is a single-serve coffee making device. In certain embodiments, the second hot water tank will be configured to be smaller in size (based on its volume), relative to the first hot water tank. The water dispenser will include a hot water pump, which causes hot water to travel from the first hot water tank to the second hot water tank, to back-fill water that leaves the second hot water tank as coffee is made by a user. In certain alternative embodiments, the invention provides that the bottled water dispenser includes a single hot water tank, which is configured to hold water that a user may dispense as desired—and is further configured to supply hot water to the coffee making device.

According to such aspects of the invention, when the water dispenser includes two separate hot tanks, the water that will eventually be used to make coffee may be held at a sufficiently high temperature, e.g., about 92-96 degrees Celsius, within the second hot water tank. The invention provides that replacement water that enters the second hot water tank, from the first hot water tank, may quickly be heated to the desirable coffee-making temperature, e.g., about 92-96 degrees Celsius, since the starting temperature will already be elevated from being held in the first hot water tank. This design also reduces the "waiting time" that is often associated with prior art coffee makers, since the water in the second hot tank is held at a temperature that may be effectively and immediately used to produce coffee. Alternatively, when the water dispenser of the present invention comprises a single hot water tank, the hot water tank will be configured to receive water from the cold tank, and then quickly heat the water to a temperature that is suitable for use in producing a coffee beverage as described herein.

According to additional aspects of the invention, the combined bottom-loading bottled water dispenser and coffee making device may employ the use of an air storage tank, which is configured to receive, store, and release a defined volume of air (through an air tube and into the coffee making device), in order to expel residual water contained within the coffee making device after a coffee beverage is produced. In addition, according to yet further aspects of the invention, the combined bottom-loading bottled water dispenser and coffee making device may utilize certain spikes that are configured to create water entry and coffee beverage exit apertures in a disposable cartridge that houses the coffee grinds that are used to produce a coffee beverage. In such cases, the spike that is configured to create the coffee beverage exit aperture may include one or more apertures and/or cut-out regions through which the coffee beverage flows into a surrounding basket that holds the disposable cartridge, whereupon the coffee beverage may then exit the basket through a separate aperture (to be dispensed for consumption through a dedicated coffee beverage tap).

The above-mentioned and additional features of the present invention are further illustrated in the Detailed Description contained herein.

BRIEF DESCRIPTION OF THE FIGURES

FIG. 23A: An illustration of a water dispenser and coffee making device of the present invention.

FIG. 23B: An illustration of another water dispenser and coffee making device of the present invention, which is taller than the dispenser of FIG. 23A.

DETAILED DESCRIPTION OF THE INVENTION

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Figures 6A, 6B:
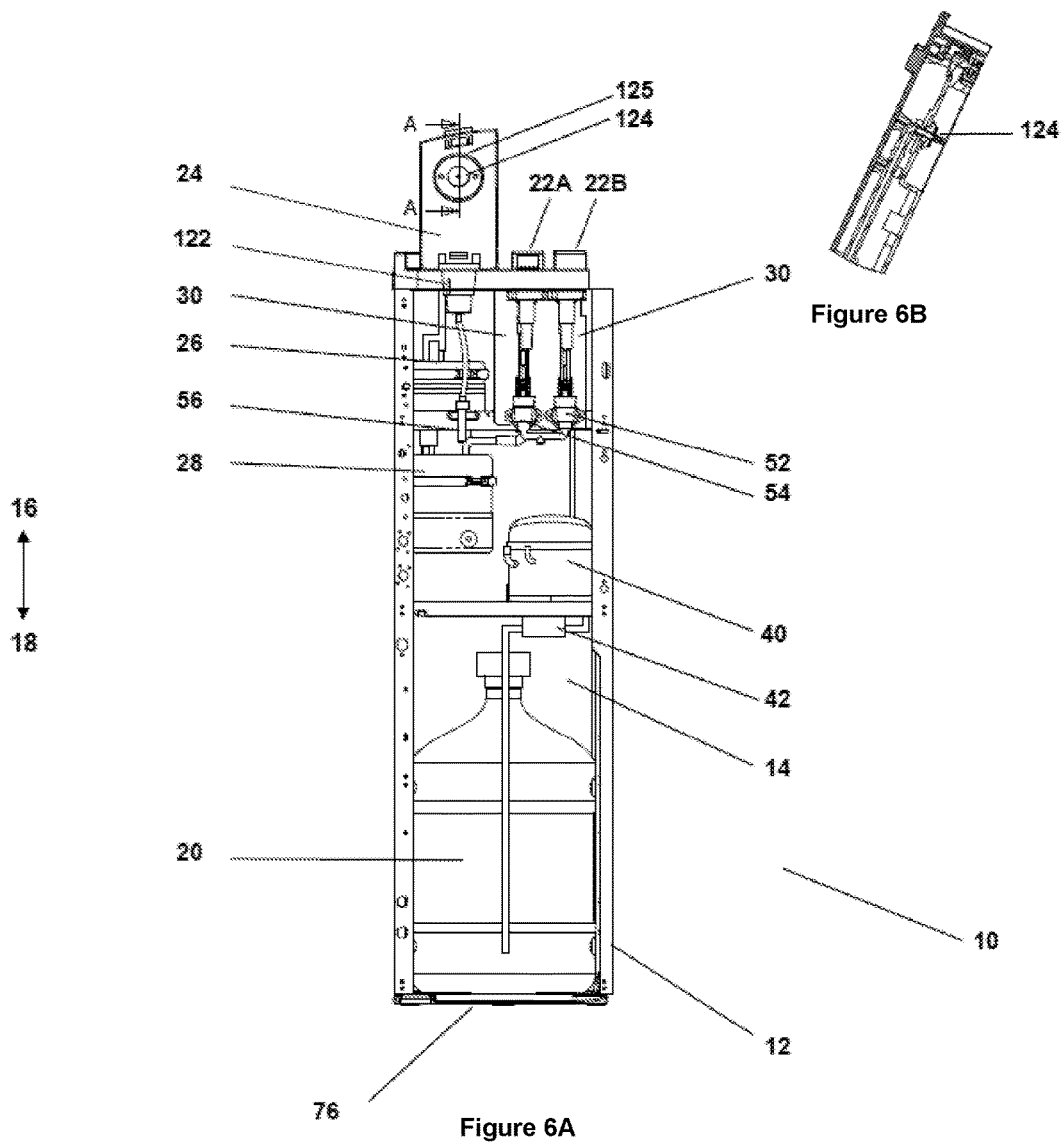
FIG. 6A: A front interior (cross-sectional) view of the water dispenser of FIG. 5.
FIG. 6B: A side view of the lid portion of the water dispenser of FIG. 6A.

According to certain preferred embodiments of the present invention, bottom loading water dispensers are provided 10. The water dispensers generally comprise a cabinet having an exterior portion 12 and an interior portion 14, with the interior portion 14 including a top half 16 and a bottom half 18 (FIG. 6). The bottom loading water dispensers include a water bottle 20 that is disposed in the bottom half 18 of the interior portion 14 of the cabinet (in an upright position). The water dispensers will include a set of (hot 22A/cold 22B) water dispensing actuator buttons 22, which may be operated to dispense both cold water and hot water, as desired (i.e., to cause water to be extracted from the water bottle 20, travel through a set of interior tubes, through a cold tank (and, for hot water, through a hot tank), and exit through a cold or hot water tap). In addition, the invention provides that the water dispenser will include a fully integrated coffee making device 24, which will preferably be a single-serve coffee making device. As described further below, the invention provides that the coffee making device 24 will utilize water that is originally housed within the water bottle 20, and transferred to a set of two hot water tanks (described below), prior to being used to produce coffee by the coffee making device 24. In certain alternative embodiments, the water that is originally housed within the water bottle 20 may be transferred to a single hot water tank (e.g., FIGS. 3, 4, 10-12, 14, 15, 18, and 19), prior to being used to produce coffee by the coffee making device 24.

More specifically, in certain preferred embodiments (as shown in FIGS. 1, 2, 5, 6, 9, 16, 17, 20, and 21), the water dispensers of the present invention may comprise a first hot tank 28, a second hot tank 26 (positioned above the first hot tank 28), a cold tank 30, a flow meter 36 (configured to monitor the volume of water that flows from the first hot tank 28 to the second hot tank 26), a one-way valve 33 (configured to allow water to leave the second hot tank 26 and enter the coffee making device 24 and further designed to prevent brewed coffee from leaving the coffee making device 24 and flowing back into the hot tank 26 due to the pressure created in the coffee making device 24), a first pump 32 (configured to cause water to move from the first hot tank 28 to the second hot tank 26), an optional solenoid valve 38 (which is normally closed and in-line between the first hot tank 28 to the second hot tank 26), a compressor 40 (for the cooling system of the cold tank 30), a second pump 42 (configured to cause water to move from the water bottle 20 to the cold tank 30), a water bottle 20, and a coffee making device 24.

Figure 1:
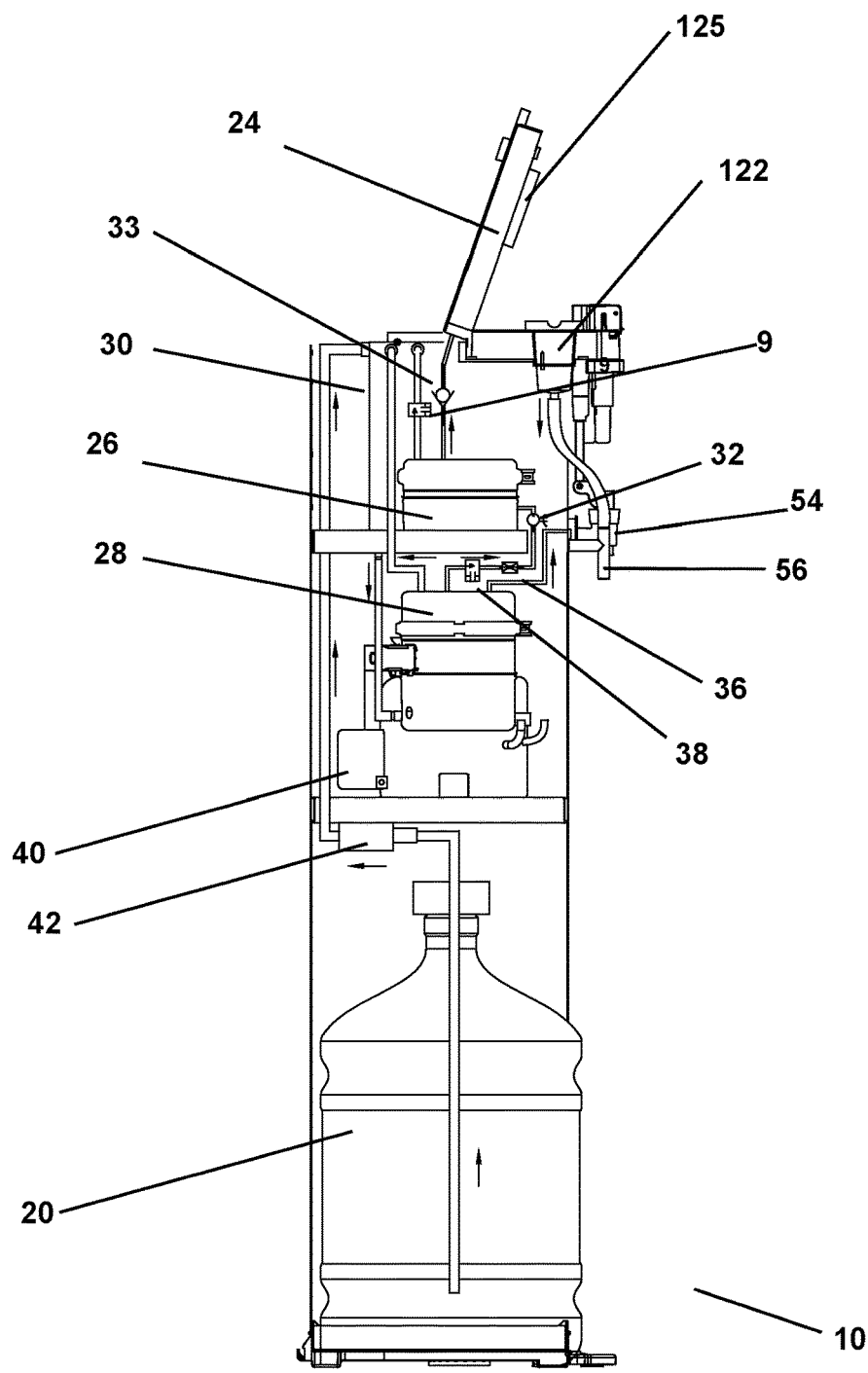
FIG. 1: A side interior (cross-sectional) view of a water dispenser described herein, which includes two hot tanks.
Figure 2:
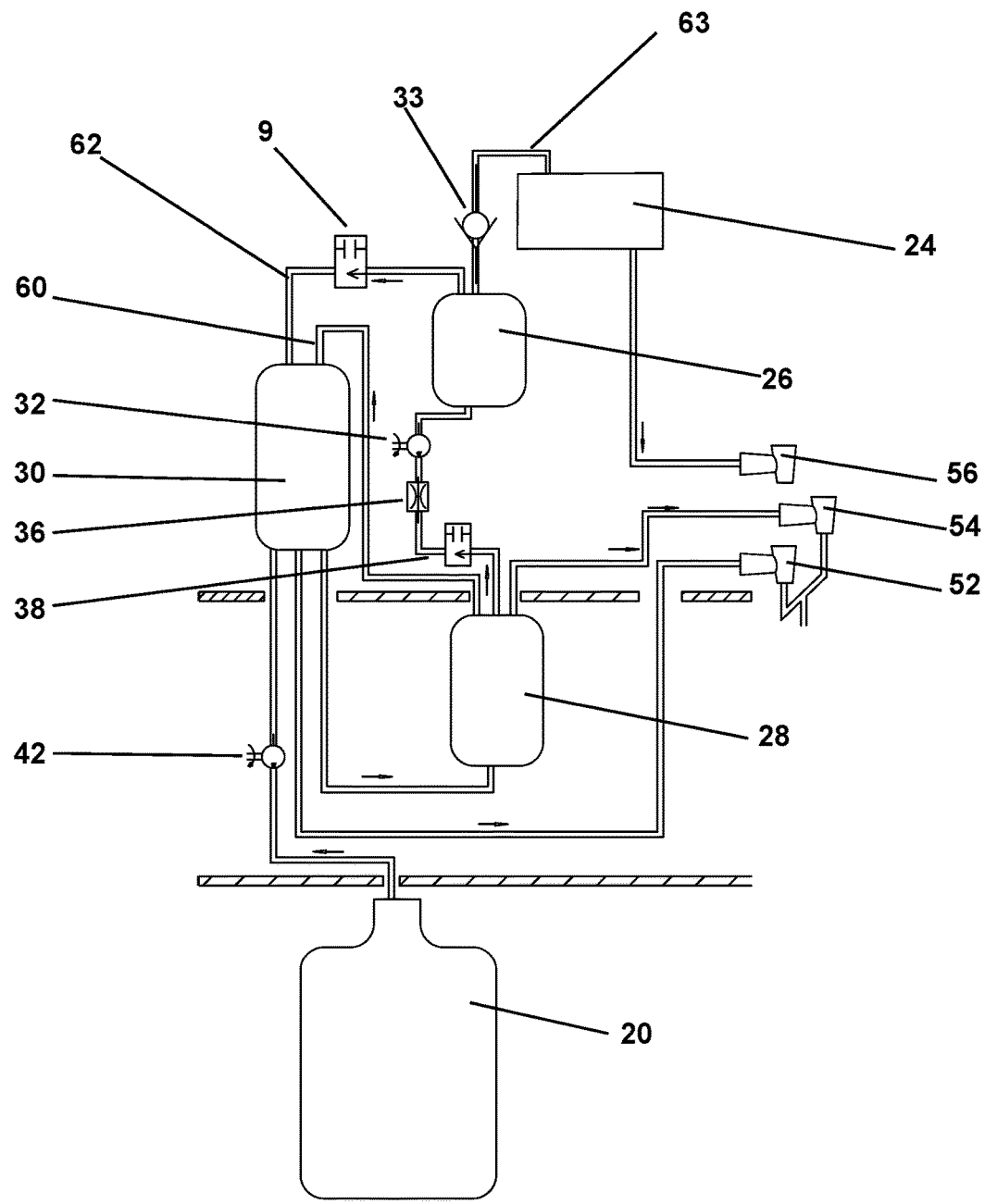
FIG. 2: A diagram that illustrates the arrangement of the two hot tanks, the cold tank, the various solenoids and one-way valves, water pumps, and flow sensors of the water dispenser of FIG. 1.
Figure 3:
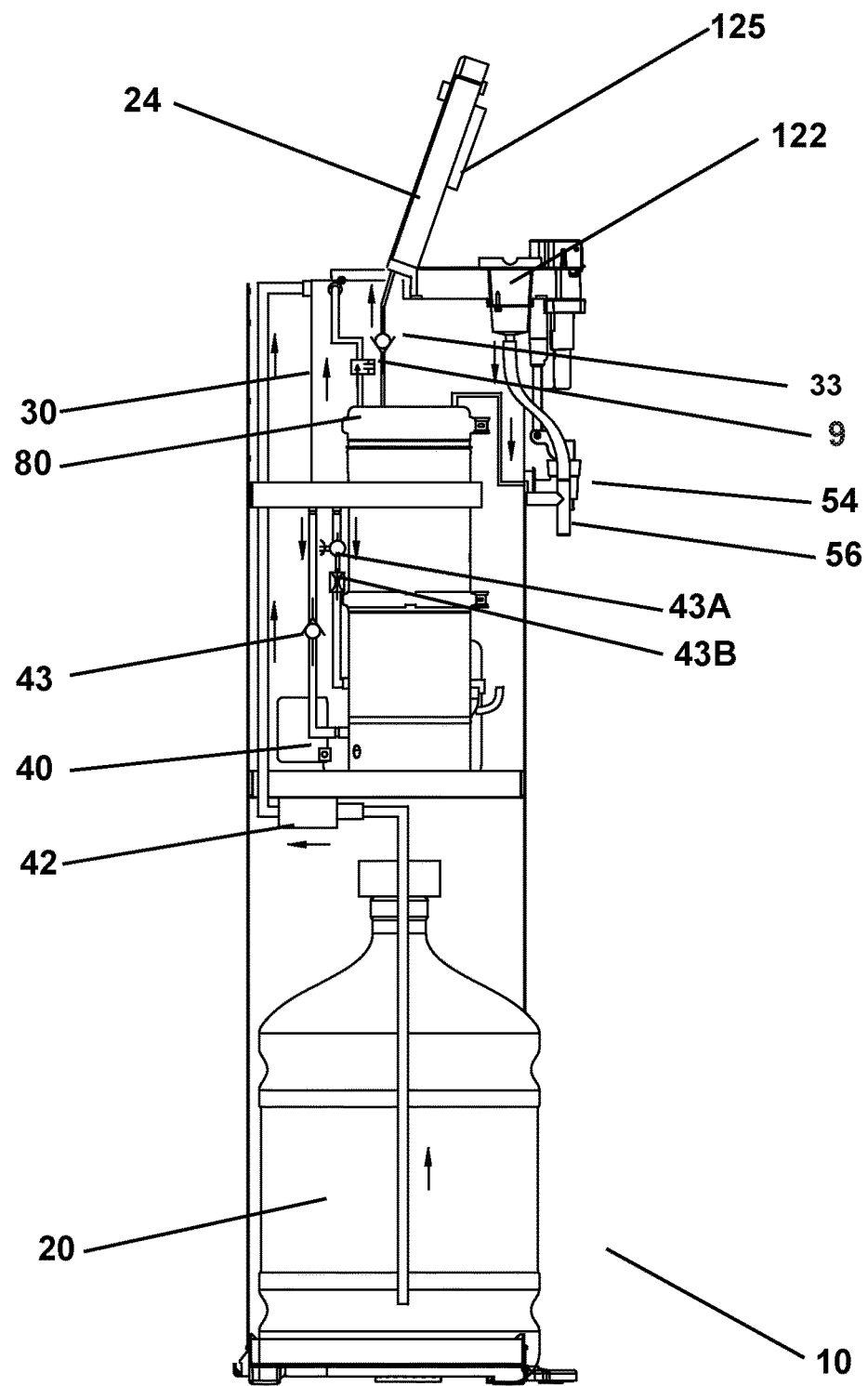
FIG. 3: A side interior (cross-sectional) view of a water dispenser described herein, which includes one hot tank.
Figure 4:
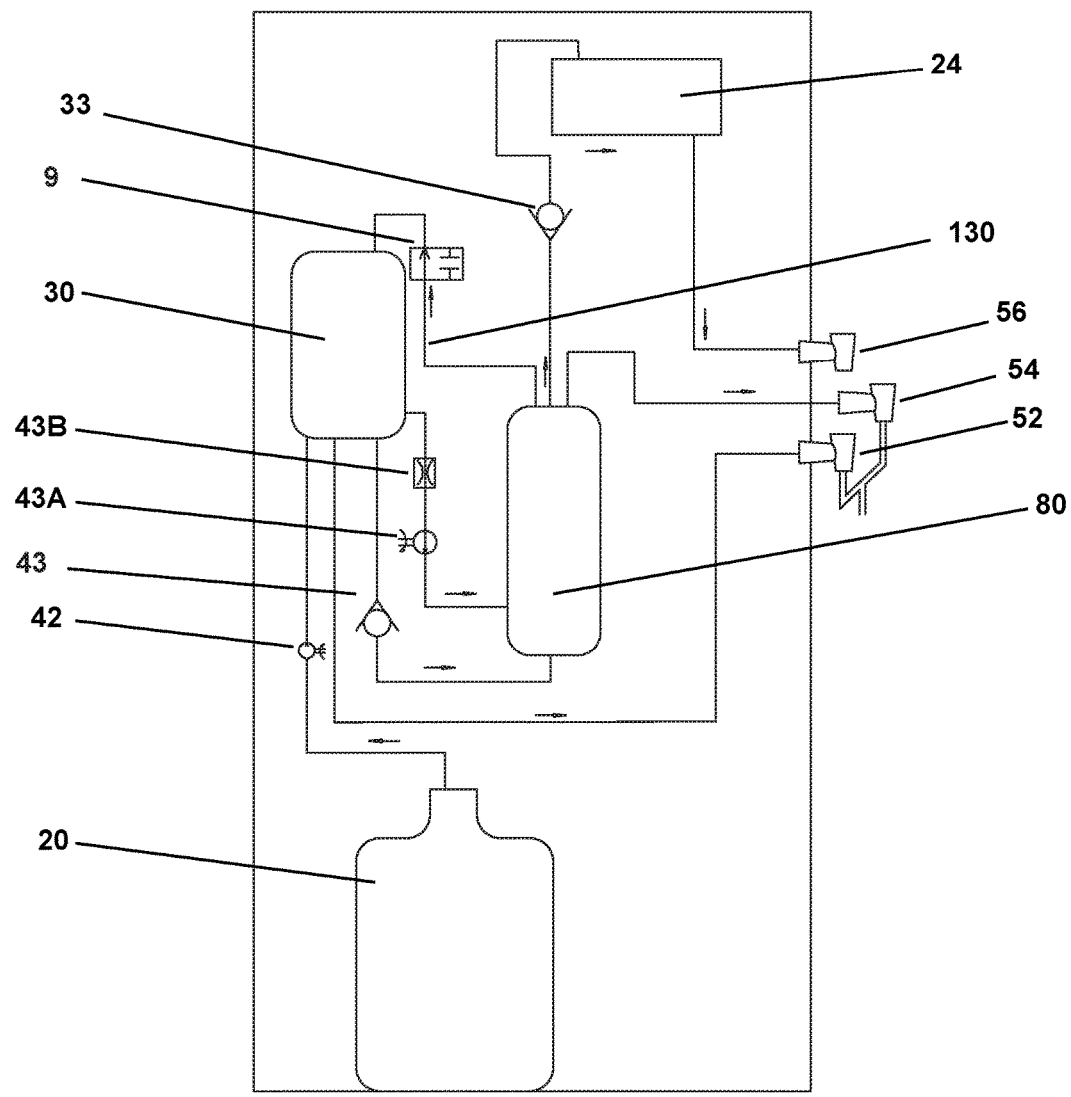
FIG. 4: A diagram that illustrates the arrangement of the hot tank, the air pump, the cold tank, the various solenoids and one-way valves, water pumps, and flow sensors of the water dispenser of FIG. 3.
Figure 5:
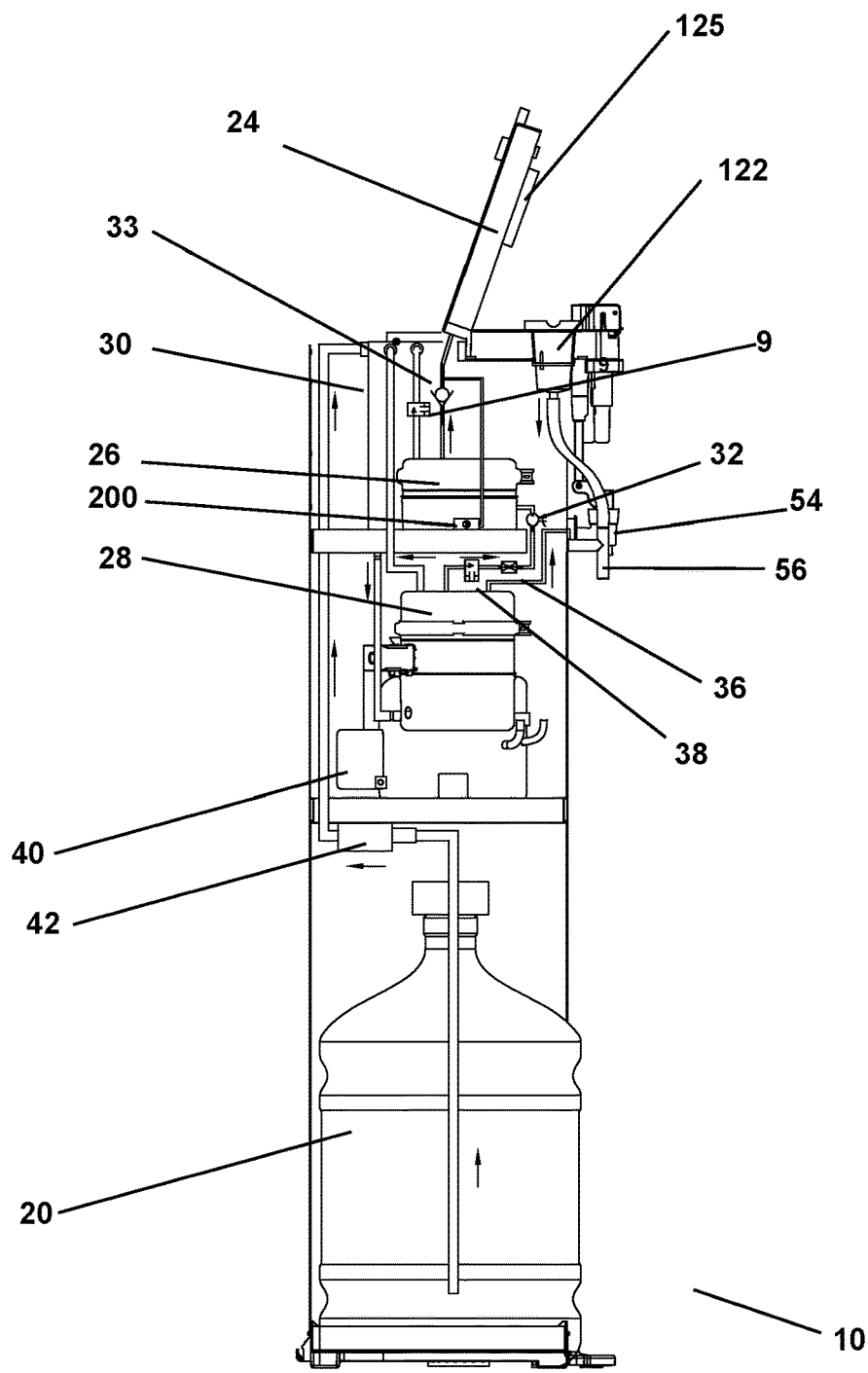
FIG. 5: A side interior (cross-sectional) view of another water dispenser described herein, which includes two hot tanks.

According to such embodiments, the invention provides that the coffee making device 24 employs the use of the dual hot tank design described herein, in order to ensure that optimal water temperatures can be quickly achieved when brewing coffee with the device. More particularly, the invention provides that water in the water bottle 20 will enter the cold tank 30 of the water dispenser, via a force provided by the second pump 42. The water that is held within the cold tank 30 may then travel through a connecting tube, via hydrostatic forces and a cold water outlet, into the first hot tank 28. In the first hot tank 28, the water is heated, e.g., via a set of electric heating coils 64 (FIG. 13E/13F), to a final temperature that ranges between 50 and 98 degrees Celsius, and preferably between 85 and 96 degrees Celsius. The invention provides that the heating coils 64 may reside within, or outside of and directly adjacent to, the hot tanks described herein. The steam that is created within the first hot tank 28 will be allowed to re-circulate and travel back to the cold tank 30 via one or more outlet (vapor) tubes 60 (FIG. 2). In addition, the invention provides that the first hot tank 28 is operably connected with a hot water outlet 54, through which hot water may be dispensed from and exit the dispenser (by a user operating the hot water actuator button 22A to cause water to flow from the hot water tap), e.g., if a user wants to access hot water to make, for example, a hot tea or hot chocolate beverage.

According to such embodiments, the hot water that is contained within the first hot water tank 28 may also flow into the second hot water tank 26, which supplies water to the coffee making device 24, via an optional solenoid (or one-way) valve 38, a first flow sensor 36, and a first pump 32. The optional solenoid (or one-way) valve 38 is preferably closed, unless water is traveling from the first hot water tank 28 to the second hot water tank 26. In the second hot water tank 26, the water is heated, e.g., via a set of electric heating coils, to a final temperature that preferably ranges between 93 and 96 degrees Celsius.

The invention provides that the steam and excess hot water (created due to expansion from the water heating process) that is generated within the second hot water tank 26 may be diverted back to the cold tank 30 through a separate outlet (vapor) tube 62 and solenoid valve 9. The invention provides that the one-way solenoid valve 9 is typically open, unless water is being diverted to the coffee making device 24. The invention provides that the solenoid valve 9 will preferably be open, in order to allow steam that is generated within the second hot water tank 26 to be diverted back to the cold tank 30 at all times (through the outlet tube 62 and solenoid valve 9), unless water is being transferred from the second hot water tank 26 to the coffee making device 24 via a dedicated tube 63, which includes a one-way spring-loaded valve 33. The one-way spring-loaded valve 33 is normally closed due to a light force provided by the spring, such that steam and vapors do not drip into the coffee making device 24, but will be caused to open by water pressure, when water is transferred from the second hot water tank 26 to the coffee making device 24 (with the water pressure being provided by the pump 32).

Figure 7:
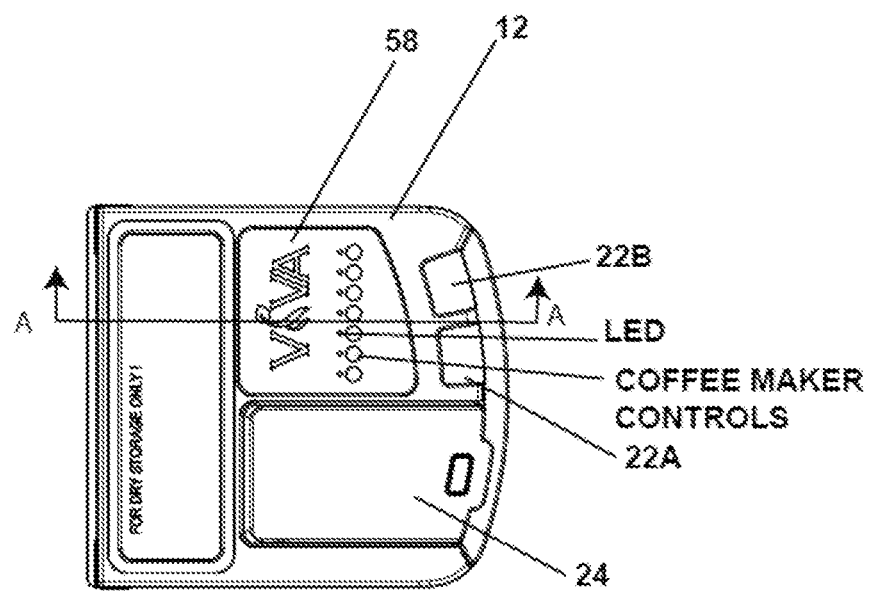
FIG. 7: A topside view of the water dispenser of FIG. 1.
Figure 8:
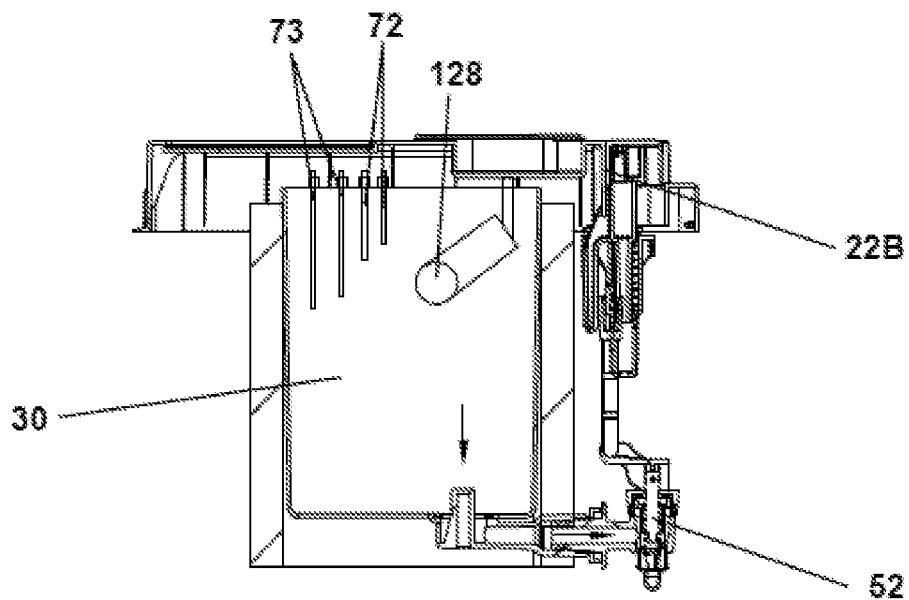
FIG. 8: An illustration of the cold tank that is incorporated into the water dispensers described herein.
Figure 9:
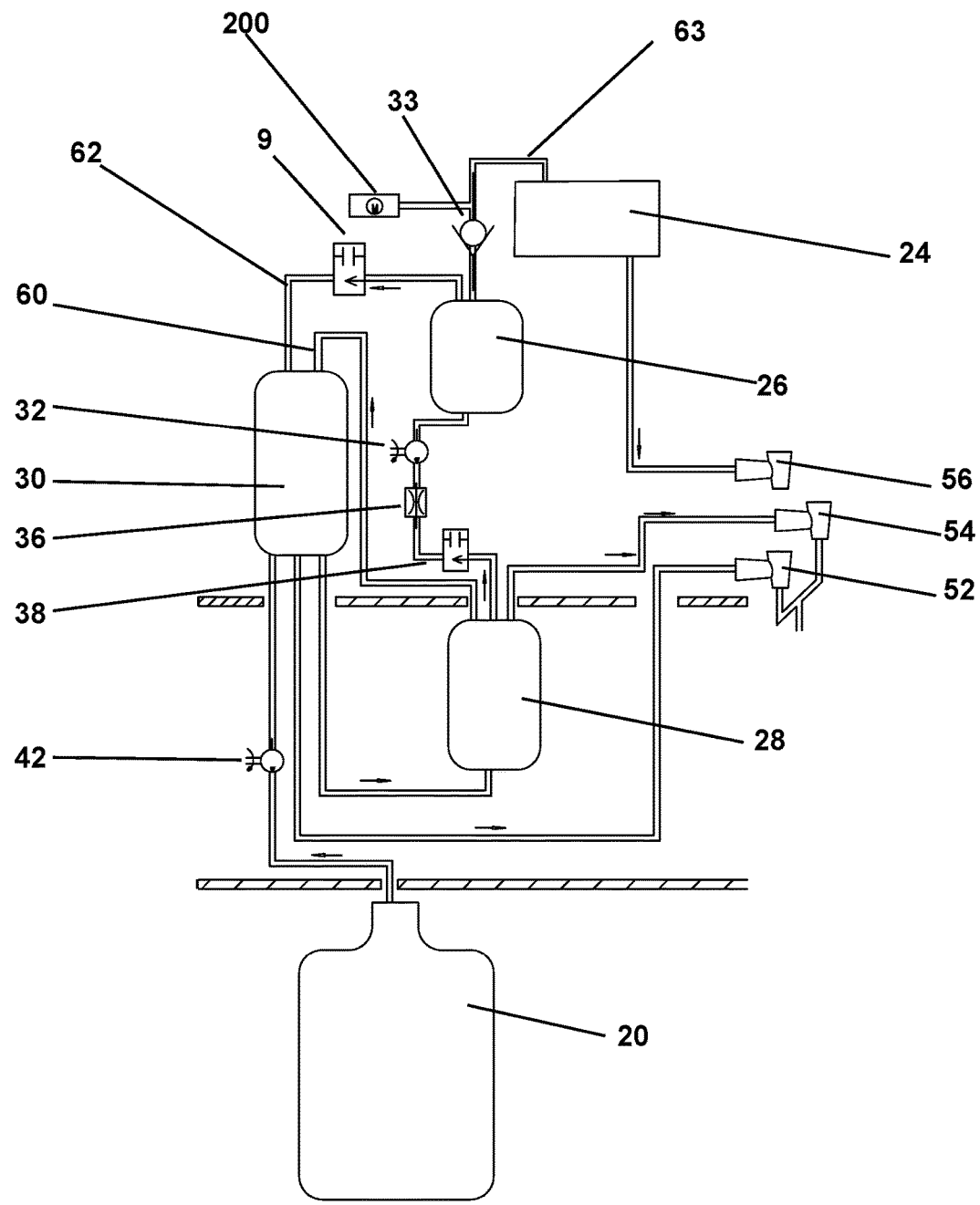
FIG. 9: A diagram that illustrates the arrangement of the two hot tanks, the cold tank, the various solenoids and one-way valves, water pumps, air pump, and flow sensors of the water dispenser of FIG. 5.
Figure 10:
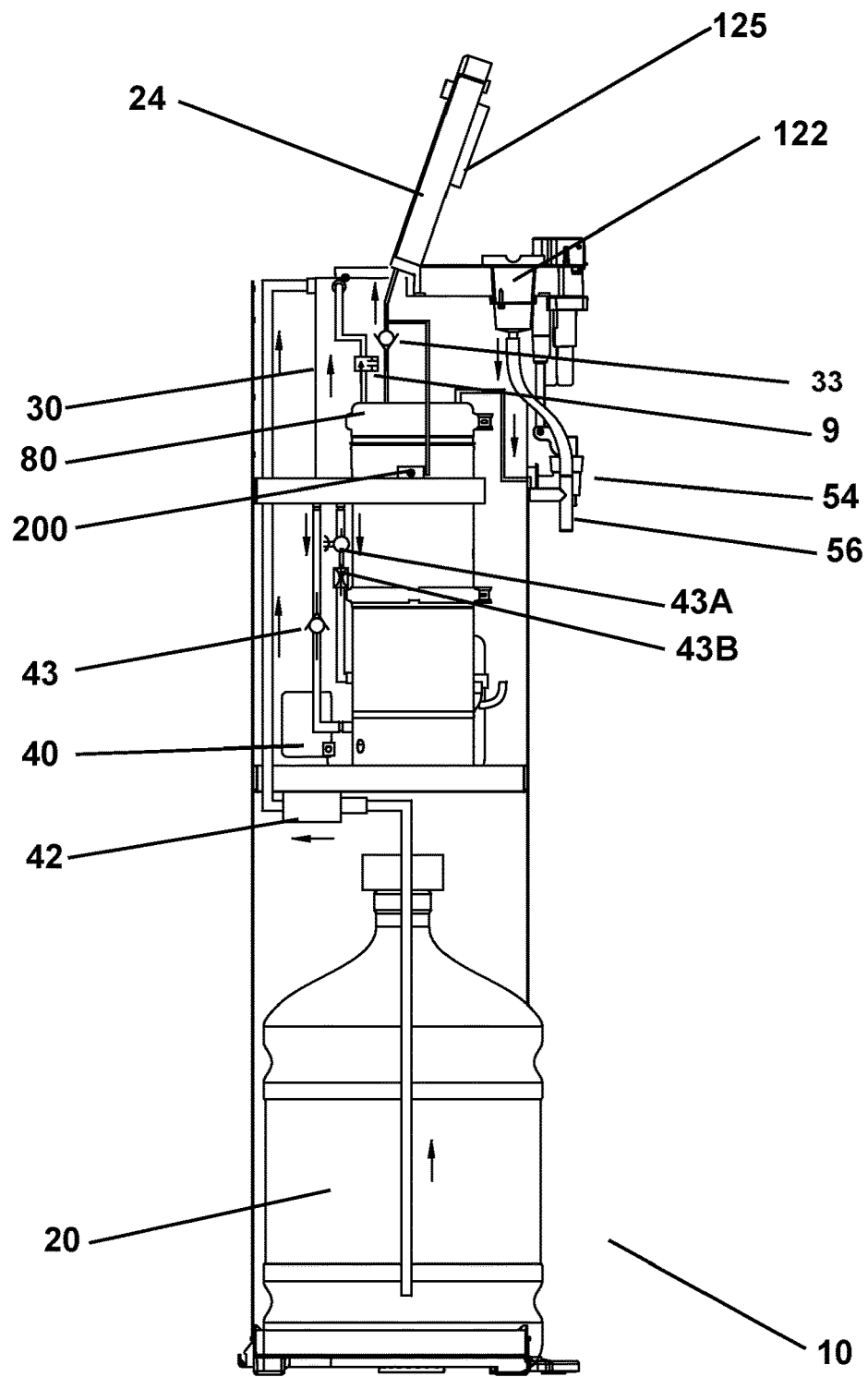
FIG. 10: A side interior (cross-sectional) view of another water dispenser described herein, which includes one hot tank.
Figures 11A, 11B:
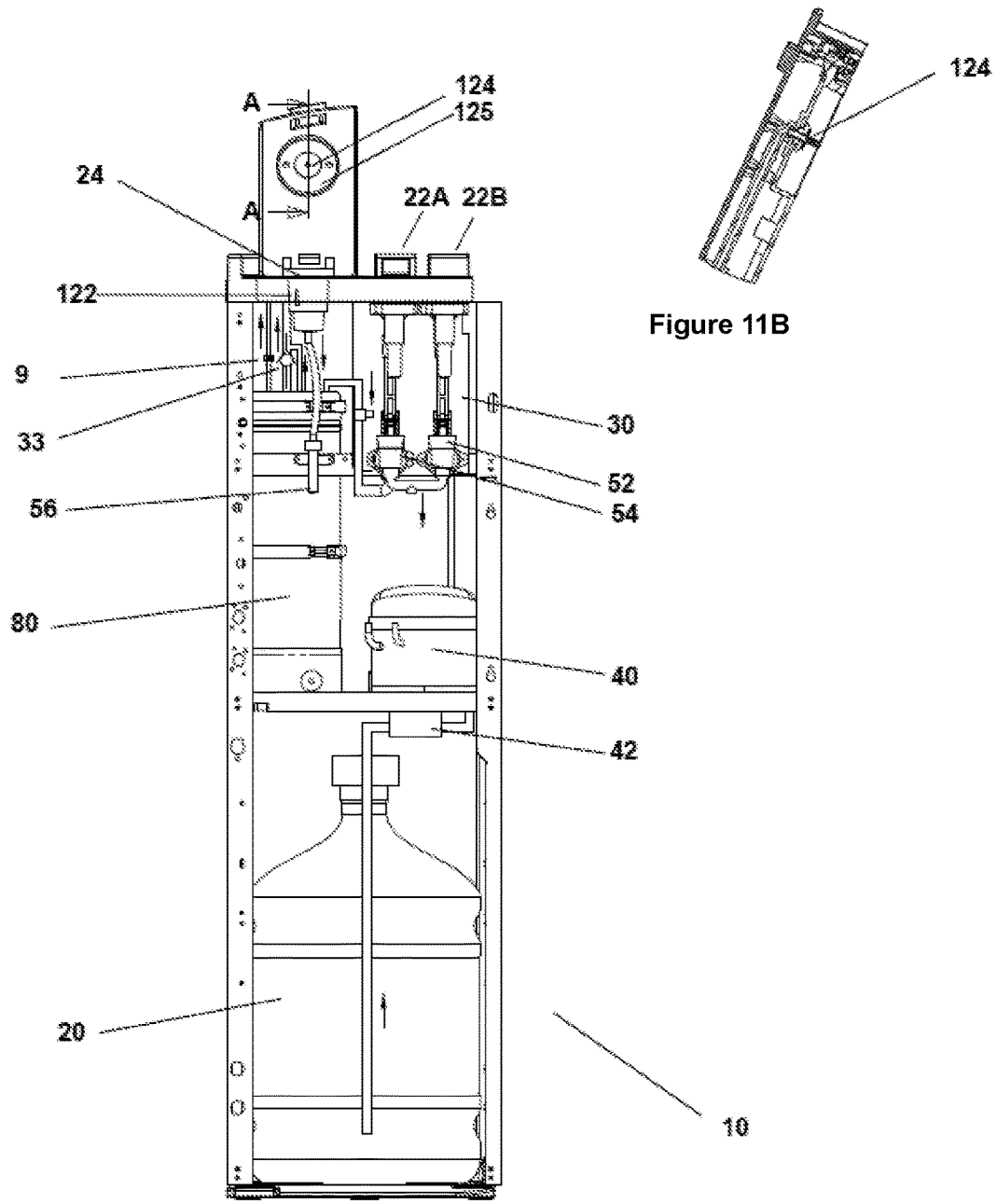
FIG. 11A: A front interior (cross-sectional) view of the water dispenser of FIG. 10.
FIG. 11B: A side view of the lid portion of the water dispenser of FIG. 11A.
Figure 12:
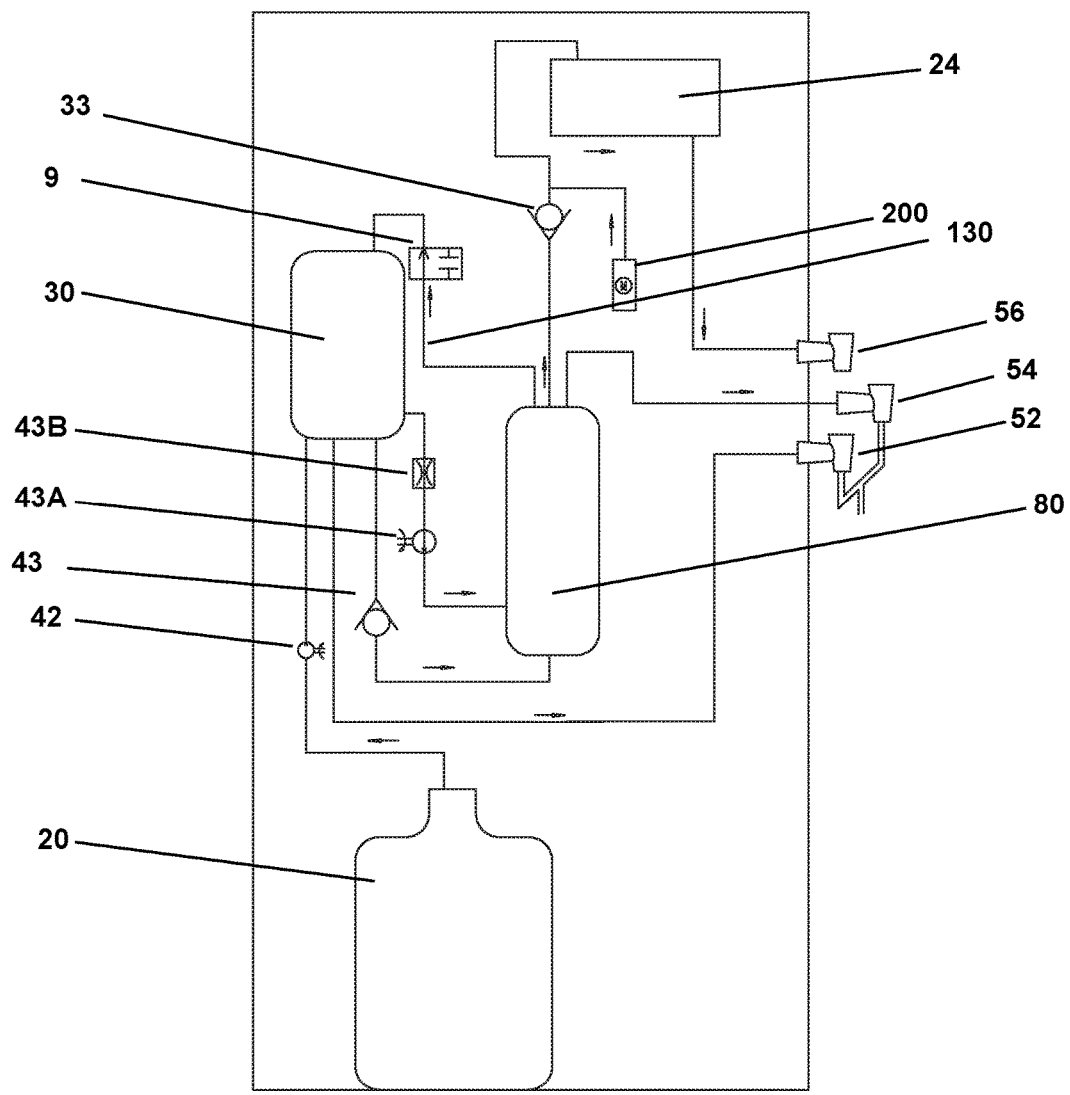
FIG. 12: A diagram that illustrates the arrangement of the hot tank, the cold tank, the various solenoid and one-way valves, pumps, and flow sensors of the water dispenser of FIG. 10.

The invention provides that the user controls of the water dispenser (FIG. 7) may be operated to cause hot water to travel from the second hot water tank 26 and into the coffee making device 24. Within the coffee making device 24, the hot water makes contact with an appropriate volume of coffee grinds, which melts the coffee grinds to create the desired coffee beverage. In such embodiments, the coffee grinds may reside in a plastic, disposable cartridge, whereby the coffee making device 24 is configured to make a hot water entry aperture and hot water exit aperture in the cartridge (which may be comprised of tin foil, plastics, or combinations thereof), such that the hot water may enter the cartridge, contact the coffee grinds, dissolve the coffee grinds to produce a coffee beverage, and then be expelled from the cartridge through the exit aperture, such that the coffee beverage may be dispensed via a dedicated coffee outlet 56 (and coffee tap).

Figure 25:
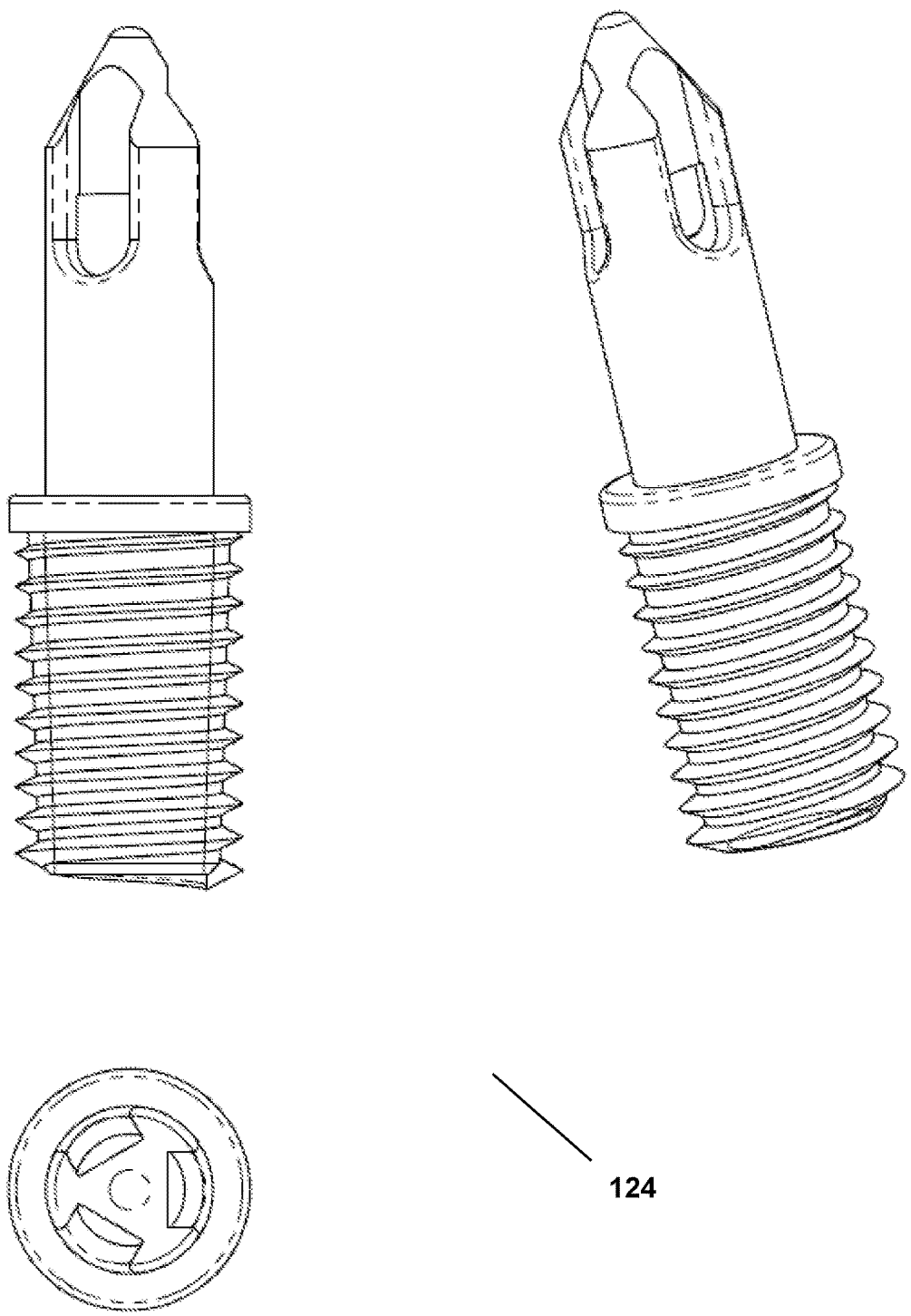
FIG. 25: An illustration of a sharp-ended spike of the coffee making device described herein.

More particularly, the invention provides that the coffee making device 24 may comprise two hollow spikes, which are configured to create the hot water entry and hot water (coffee beverage) exit apertures. Preferably, a first spike 124 (FIGS. 6, 11, and 25) will comprise a blunt end (located within a lid portion of the dispenser), which will be configured to pierce the top of the coffee cartridge to create the hot water entry aperture. The second spike 123 (FIGS. 28-45) will be located in a basket 122, which is configured to receive the coffee cartridge in the coffee making device 24. The second spike 123 will be configured to exhibit a sharp end, and to be capable of piercing the bottom of the cartridge to create the exit aperture.

The invention provides that the first spike 124 is hollow, and is coupled to a line that delivers water to the coffee making device 24 (from a hot tank). As shown in FIGS. 28-45, the second spike 123 may exhibit a variety of configurations. In certain embodiments, the second spike 123 may comprise one or more apertures (e.g., FIG. 42), or simply exhibit a curved piece of material with a side (or contiguous area) that is removed or cut-out (e.g., FIGS. 28, 32, 34, 36, 38, 40, and 44), through which coffee beverage may exit and enter the surrounding basket 122. More specifically, the second spike 123 may comprise a sharp end 300; a threaded end (or a roughed end) 302 opposite of the sharp end 300; and a middle portion between the sharp end 300 and threaded end 302 that comprises (1) one or more apertures 304 (e.g., FIG. 42); (2) a curved material having a cut-out region 306 between a beginning and ending side of the curved material (e.g., FIG. 28, 32, 34, 36, 38, 40, and 44); or (3) a combination of one or more apertures 304 and a cut-out region 306 (e.g., FIG. 30). The invention provides that the threaded ends 302 of the spikes 124,123 will be configured to help bond and connect the spikes 124,123 to the injected plastic housings into which the spikes 124,123 are positioned and attached. The invention provides that the second spike 123, after creating the exit aperture in the coffee cartridge, will be configured to cause the brewed coffee beverage to exit the coffee cartridge through (1) the one or more apertures 304 and/or cut-out regions 306; (2) through the exit aperture in the cartridge itself; or (3) combinations of (1) and (2), such that the coffee beverage then flows into the surrounding basket 122.

The invention provides that the basket 122 will preferably include an aperture 126 through which the coffee beverage may then exit the basket 122, which is coupled to a line that removes coffee beverage from coffee making device 24, and allows such coffee beverage to exit through the coffee outlet 56 (and coffee tap). The invention provides that, in certain embodiments, a filter 308 may be disposed within, near, or on top of the aperture 126 (e.g., FIGS. 33, 35, 39, and 45), which serves to retain coffee grinds within the basket 122 and prevent such grinds from exiting the coffee making device 24 and coffee outlet 56.

The invention provides that the coffee making device 24 will preferably comprise a self-locking lid, which may be opened (and closed) at the top side of the cabinet of the water dispenser, such that the disposable cartridges (which contain the ground coffee ingredients) may be inserted into and removed from the basket 122 of the coffee making device 24 as needed. The invention provides that the self-locking lid may be opened (about an axis located at one side of the lid); a disposable cartridge may be placed into the basket 122 of the coffee making device 24; and the lid may then be closed, which causes the first spike 124 to pierce the top of the coffee cartridge and, subsequent to the top of the cartridge being pierced, the second spike 123 will pierce the bottom of the cartridge. According to certain preferred embodiments, the first spike 124 (which preferably exhibits a blunt end) will be recessed within (or, alternatively, flush with) a surrounding "safety" wall 125 (FIGS. 1, 3, 5, and 6). The invention provides that the surrounding wall 125 will prevent a user from inadvertently making contact with the spike 124 and potentially injuring his/her hand. In addition to the safety feature provided by the wall 125, the invention provides that the blunt-ended shape of the spike 124 further mitigates the chance for user injury.

Figure 46A:
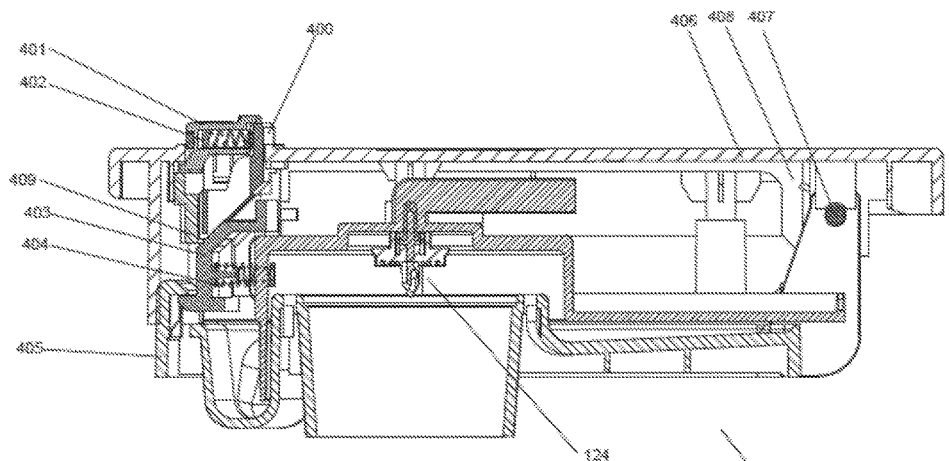
FIG. 46A: A side cross-sectional view of the lid and child safety feature (latch) described herein.
Figure 46B:
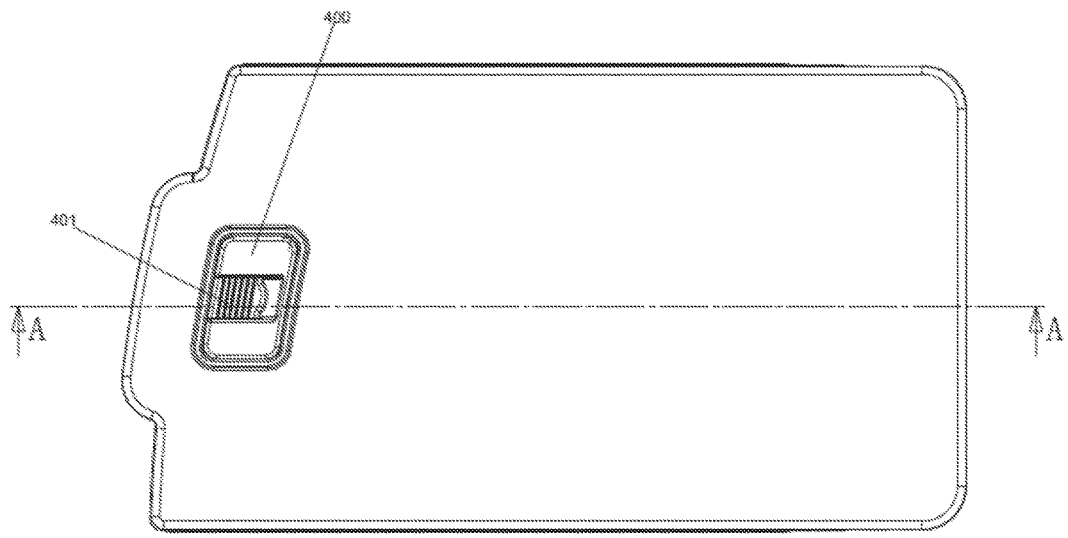
FIG. 46B: A top view of the lid and child safety feature (latch) described herein.
Figure 47A:
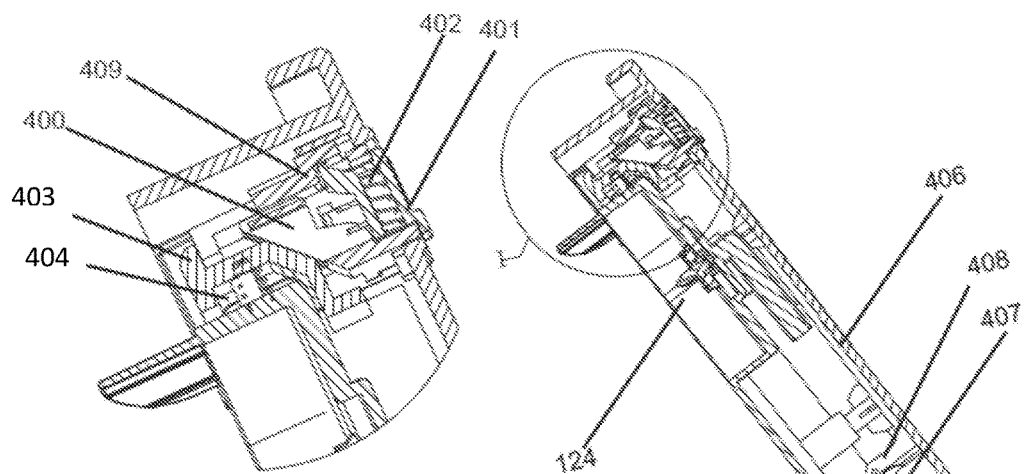
FIG. 47A: A side cross-sectional view of the end portion of the lid and the child safety feature (latch) described herein, after the lid has been opened.
Figure 47B:
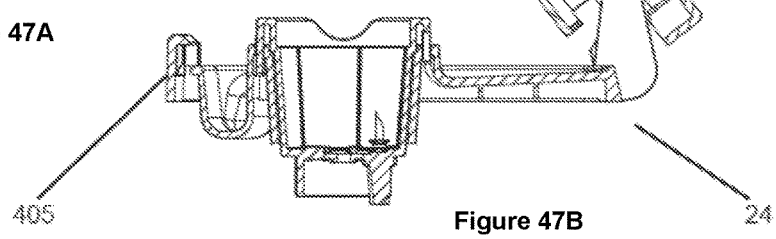
FIG. 47B: A side cross-sectional view of the lid and the child safety feature (latch) described herein, after the lid has been opened.
Figure 47C:
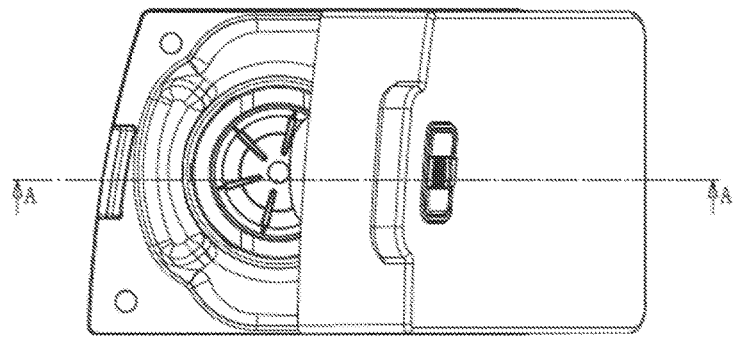
FIG. 47C: A topside view of the lid, in a partially opened position.
Figure 48A:
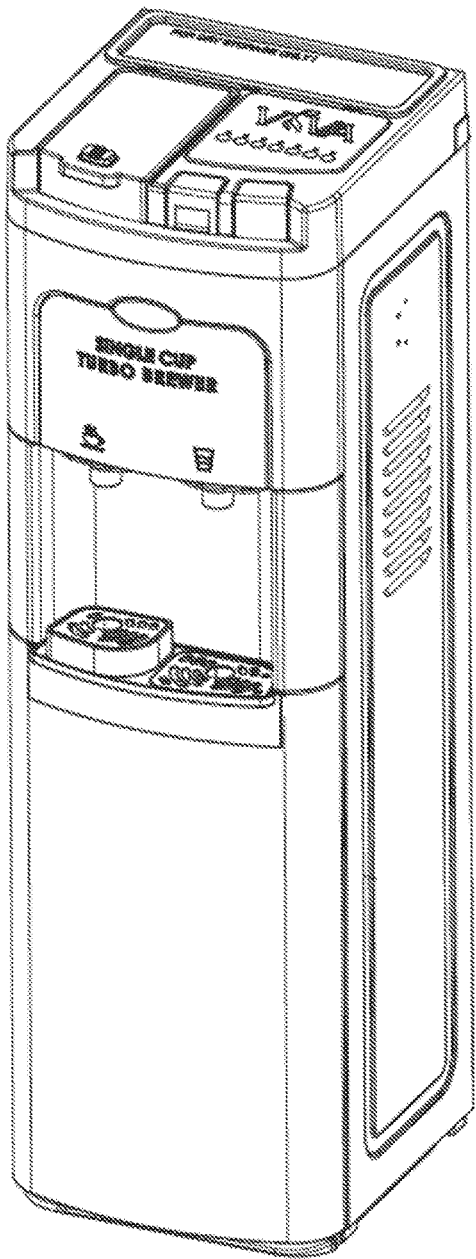
FIG. 48A: A perspective view of a dispenser having the child safety feature (latch) described herein.
Figure 48B:
FIG. 48B: A topside view of the lid of the dispenser of FIG. 48A.

Referring now to FIGS. 46-48, according to certain embodiments, the lid portion 406 of the coffee making device 24 may comprise a child safety feature, which is configured to prevent a child from opening the lid 406, while hot water is being delivered to the coffee making device 24.

More specifically, the child safety feature may comprise a slide 401, which a user may push forward and towards the backside of the dispenser. The slide 401 will be subject to a constant bias force imparted by a spring 402, which exerts a force on the slide 401 towards the front of the dispenser. When the slide 401 is pushed forward, a connected piece beneath the top surface of the slide 401 is moved away from a lock stop 409. After the slide 401 is pushed forward, a button 400 (in which the slide 401 resides) may be depressed downwards. The invention provides that when the button 400 is depressed downwards, a connected tapered portion of the button 400 (which resides within the lid 406) will push another internal slide 403 towards the rear of the dispenser, which causes the internal slide 403 to disengage from a lock tab 405. When the button 400 is not depressed, the internal slide 403 and lock tab 405 are engaged (e.g., FIG. 46A), with the internal slide 403 being subject to a constant bias force exerted by a spring 404 towards the lock tab 405, such that the lock tab 405 mechanically prevents the lid 406 from opening. When the button 400 is depressed, and the internal slide 403 and lock tab 405 are disengaged (e.g., FIG. 47B), the lock tab 405 no longer prevents the lid 406 from opening. As such, upon release of the pressure from slide 401 and push button 400, the lid 406 will open via a force exerted by another spring 408 and will rotate around the hinge pin 407. Accordingly, as described above, the child safety feature requires a user to impart two different, yet simultaneous, forces on the slide 401 (force exerted towards the back of the dispenser) and button 400 (force exerted downwards from lid 406), in order to open the lid 406 (which is effective to prevent young children from inadvertently opening the lid 406).

The invention provides that a user may instruct the water dispenser to produce a serving of coffee, through a main control board 58 located on the exterior cabinet of the water dispenser (e.g., on the top side of the exterior cabinet). The main control board 58 will issue a signal to activate a control solenoid valve 38, whereupon hot water that is contained within the first hot water tank 28 travels into the second hot water tank 26 (with the force being provided by the pump 32), with the first flow sensor 36 controlling and monitoring water capacity of the second hot water tank 26. When the second hot water tank 28 reaches full capacity, the control solenoid valve 38 and pump 32 stop working. As water is being pumped from the first hot tank 28 and into the second hot tank 26, hot water from the second hot tank 26 will be forced into the coffee making device 24 via tube 63. The one-way valve 33 will be opened from its normally closed position by the force of the water. As described above, the hot water will travel through tube 63, through one or more apertures located near the tip of the first spike 124, and into the coffee cartridge (where the hot water makes contact with the coffee grinds for a defined and sufficient period of time, before the resulting coffee beverage is extracted from the coffee making device 24 (basket 122) and exits through the aperture 126 and connected line that is coupled to the coffee outlet 56 and external coffee tap). The invention provides that the produced coffee beverage may exit the basket 122 and coffee outlet 56 through a force provided by a separate pump, through a gravity force (i.e., the coffee beverage being drained through the coffee outlet 56), and/or via the air forced imparted by the air storage tank 202 (described below).

After the coffee beverage is produced, the second hot tank 26 remains full with water, which is heated within the second hot water tank 26 to a pre-defined temperature, e.g., 96-degrees Celsius, at which point the second hot water tank 26 operates to maintain the water at such temperature. This process minimizes the time that is required to produce a coffee beverage (since the water in the second hot water tank 26 is at the necessary brewing temperature). In addition, this process mitigates the cooling effect of the cold water that is provided to the hot tanks from the cold tank 30, since the cold water is first transferred to the first hot tank 28 and heated, before it is later transferred to the second hot tank 26.

Still further, the invention provides that a user of the water dispenser may operate the main control board 58 to instruct the dispenser to produce a single-serving of coffee and, in so doing, may specify the volume of the serving among two or more options (e.g., a "big cup" or "small cup"). Upon issuing such instructions via the main control board 58, the control solenoid valve 38 and pump 32 are activated, whereupon a defined amount of hot water that is contained within the first hot water tank 26 is forced into the second hot water tank 26. In turn, a proportionate amount of hot water that is contained in the second hot water tank 26 is forced (under pressure) into the coffee making device 24, where such water makes contact with coffee grinds as described above, which produces the desired coffee beverage that may be dispensed via a dedicated coffee outlet 56. The invention provides that the first flow sensor 36 controls water capacity in the second hot tank 26, such that upon a user selecting the "big cup" or "small cup" option, the flow sensor 36 will issue a signal when the flow of water has reached the pre-defined water flow that is correlated with the selected "big cup" or "small cup" setting. Upon the flow sensor 36 issuing such a signal, the main control board 58 issues an instruction to deactivate the control solenoid valve 38 and pump 32, in order to stop the pumping and transfer of water from the first hot water tank 28 into the second hot water tank 26.

According to certain embodiments of the invention, in addition to the flow sensors described herein (or as an alternative to such flow sensors), a set of electrodes may optionally be used to monitor and determine when the water levels in the cold tank 30 and hot tanks 26,28 have reached full capacity. For example, when sufficient water is present in such tanks, a pair of electrodes (near the top of such tanks) will be immersed in water, such that an electrical current is allowed to flow between such electrodes. The electrical flow is communicated to the control board 58, which issues a deactivation signal to the pumps. For example, when an electrical signal is detected by electrodes 72 (FIG. 22) in the cold tank 30, the control board 58 may instruct the pump 42 not to operate; whereas, if an electrical signal is not detected by electrodes 72 in the cold tank 30 (and the water line resides below such electrodes), the control board 58 may instruct the pump 42 to activate and transfer water from the water bottle 20 to the cold tank 30, until such time that an electrical signal is detected by electrodes 72.

Figure 22:
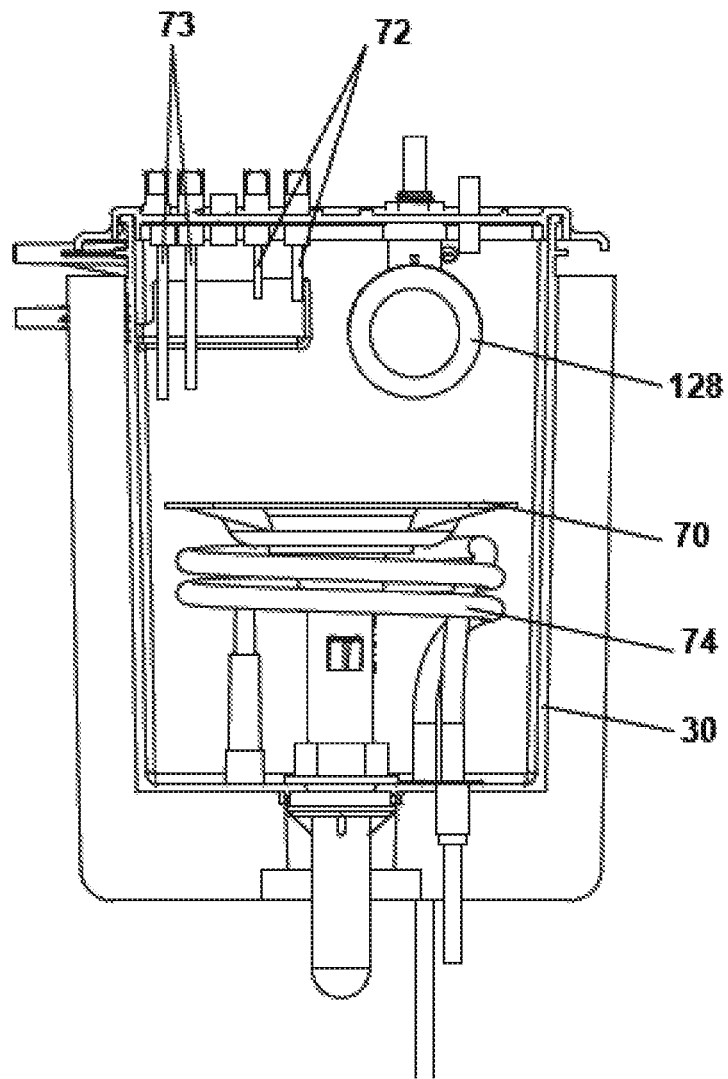
FIG. 22: An illustration of the cold tank that is incorporated into the water dispensers described herein.

Similarly, for example, when an electrical signal is detected by electrodes located near the top of the second hot tank 26, the control board 58 may instruct the pump 32 not to operate; whereas, if an electrical signal is not detected by such electrodes in the second hot tank 26 (and the water line resides below such electrodes), the control board 58 may instruct the pump 32 to activate and transfer water from the first hot tank 28 to the second hot tank 26. This flow of water may further cause water to be hydrostatically transferred (back-filled) from the cold tank 30 and into the first hot tank 28, since the cold tank 30 will be positioned higher than the first hot tank 28 (with the water that is extracted from the cold tank 30 being replaced with water that is extracted from the water bottle 20). The vent tube 60 permits steam and air to leave the hot tank 28, which also facilitates the hydrostatic transfer of water from the cold tank 30 into the first hot tank 28. Alternatively, as described herein, the current water volumes of the cold tank 30 and hot tanks 26,28 described herein may be monitored and calculated via in-line flow sensors. Referring to FIG. 22, the cold tank 30 may further comprise a buoyant cold water baffle 70, which rises and falls along with the water level within the cold tank 30. The position of the buoyant cold water baffle 70 may be monitored by the control board of the dispenser, thereby providing an alternative (or additional) means for tracking the volume of water contained in the cold tank 30. Still further, the invention further provides that a mechanical float valve 128 may, optionally, be employed to serve as a back-up water volume control for the cold water tank 30.

Figure 27:
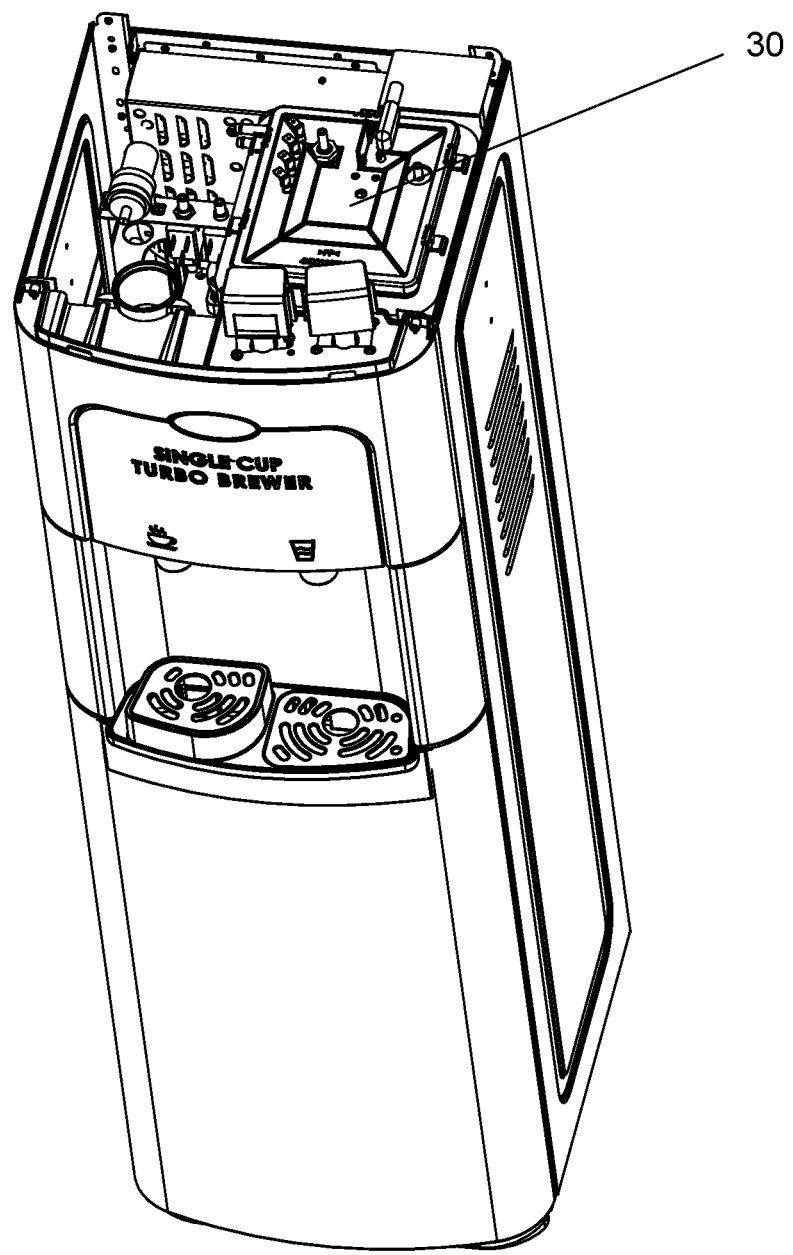
FIG. 27: An illustration of the topside of a water dispenser described herein, with the top cover removed, which shows the square-shaped top portion of the cold tank.
Figure 28:
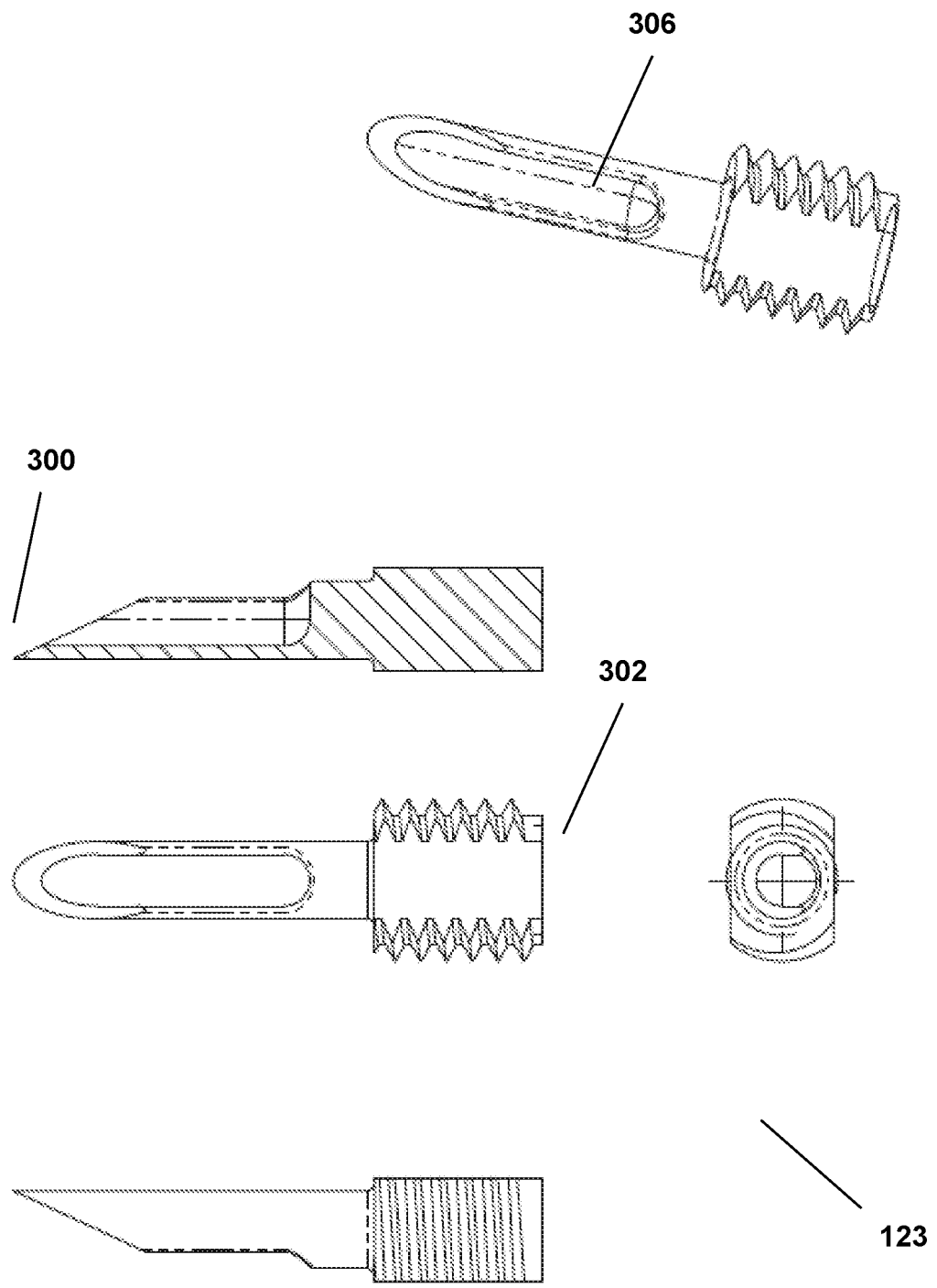
FIG. 28: An illustration of another sharp-ended spike of the coffee making device described herein, which includes a cut-out side that begins at the tip of the spike.
Figure 29:
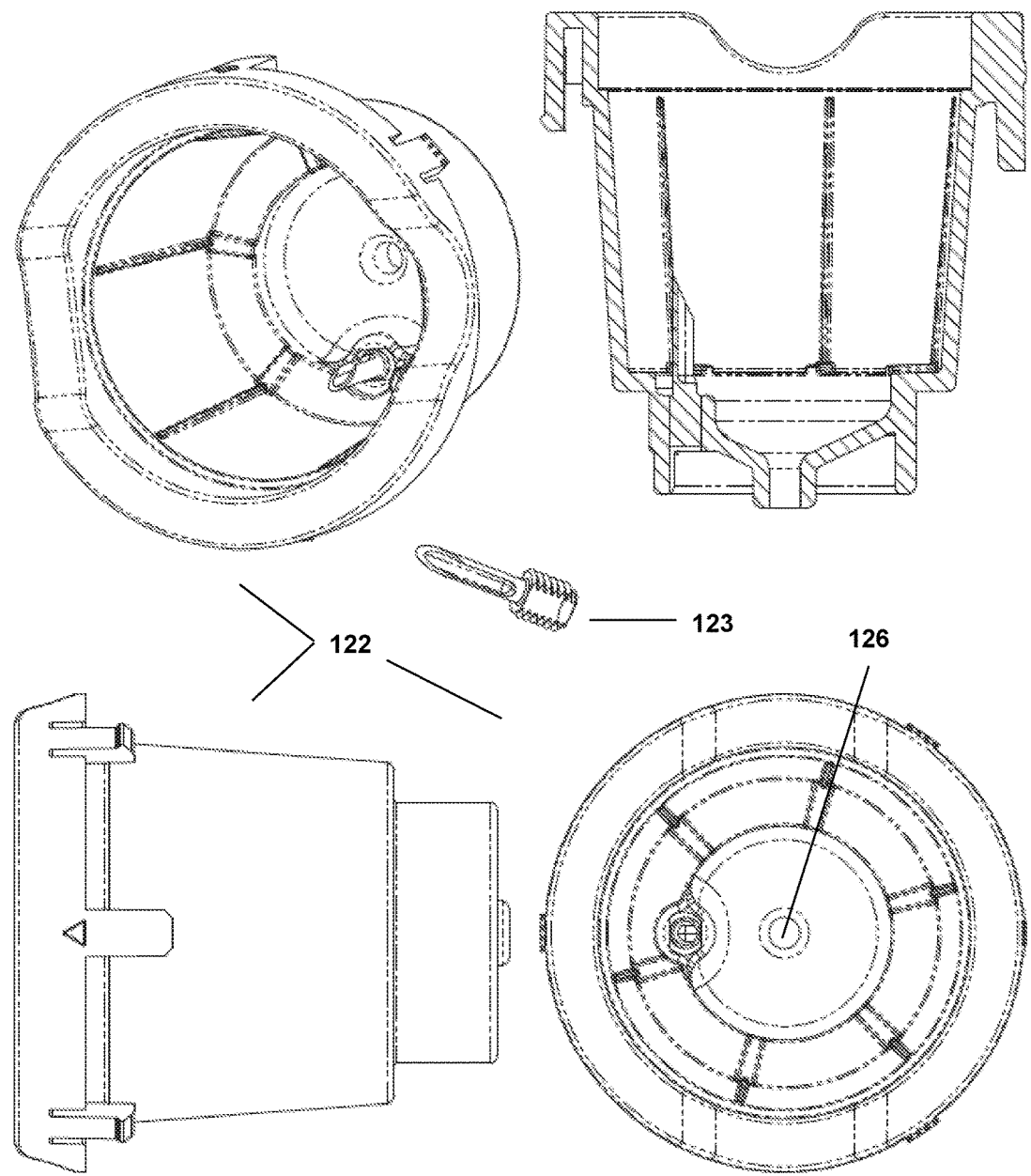
FIG. 29: An illustration of a basket that receives a coffee cartridge as described herein, which includes the sharp-ended spike of FIG. 28.
Figure 30:
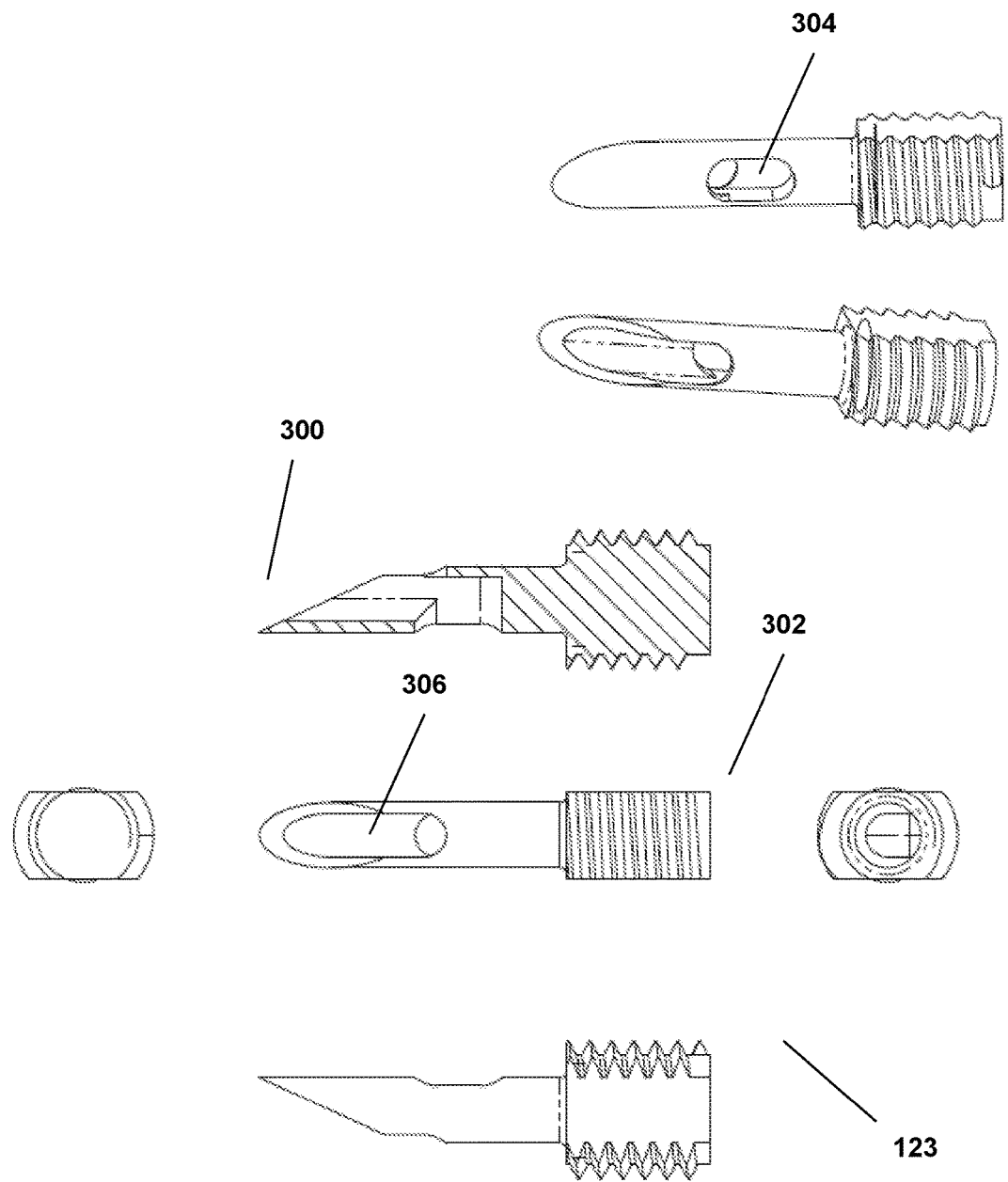
FIG. 30: An illustration of another sharp-ended spike of the coffee making device described herein, which includes a cut-out side that begins at the tip of the spike (and has a separate aperture on the other side of the spike).
Figure 31:
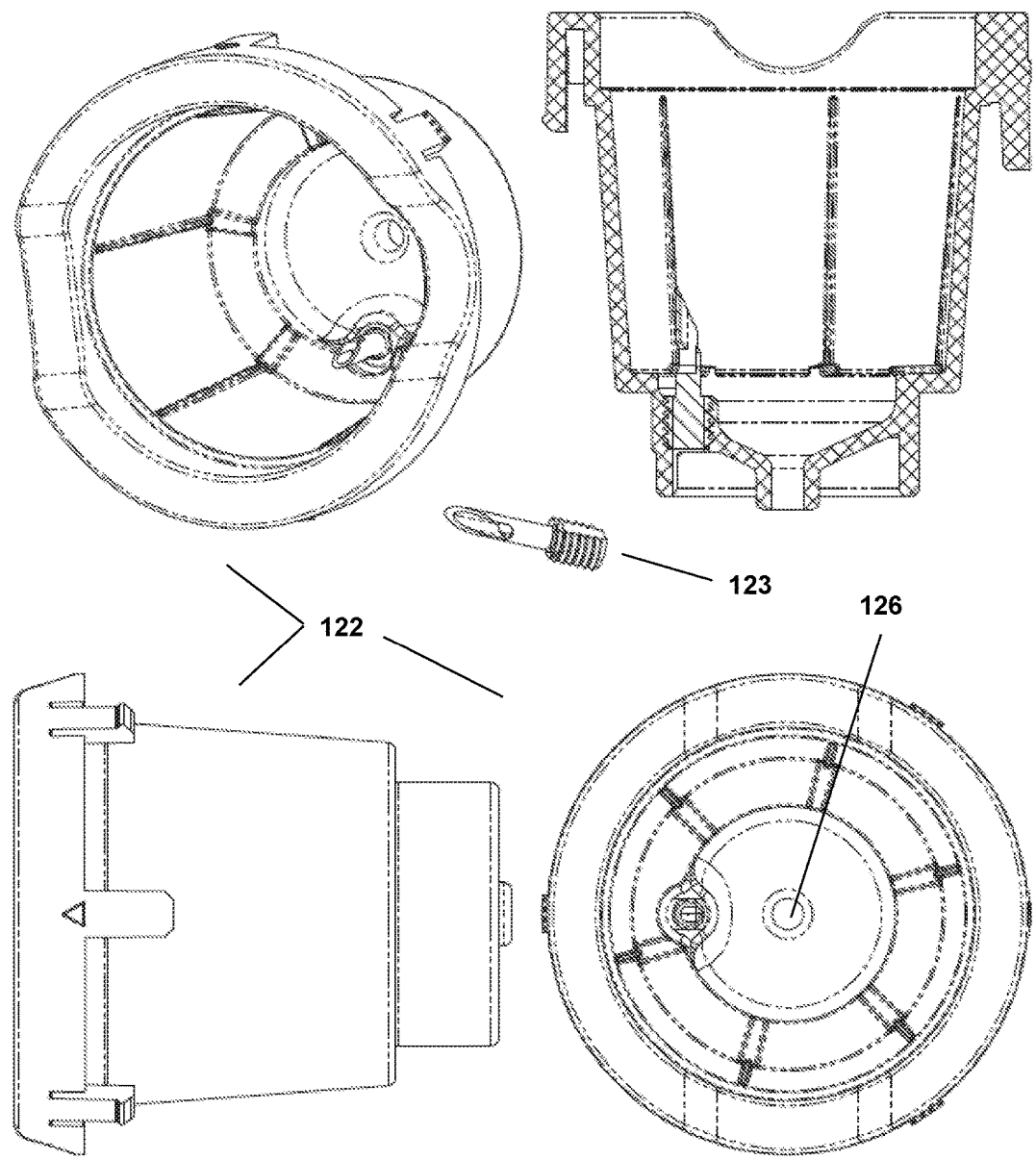
FIG. 31: An illustration of a basket that receives a coffee cartridge as described herein, which includes the sharp-ended spike of FIG. 30.
Figure 32:
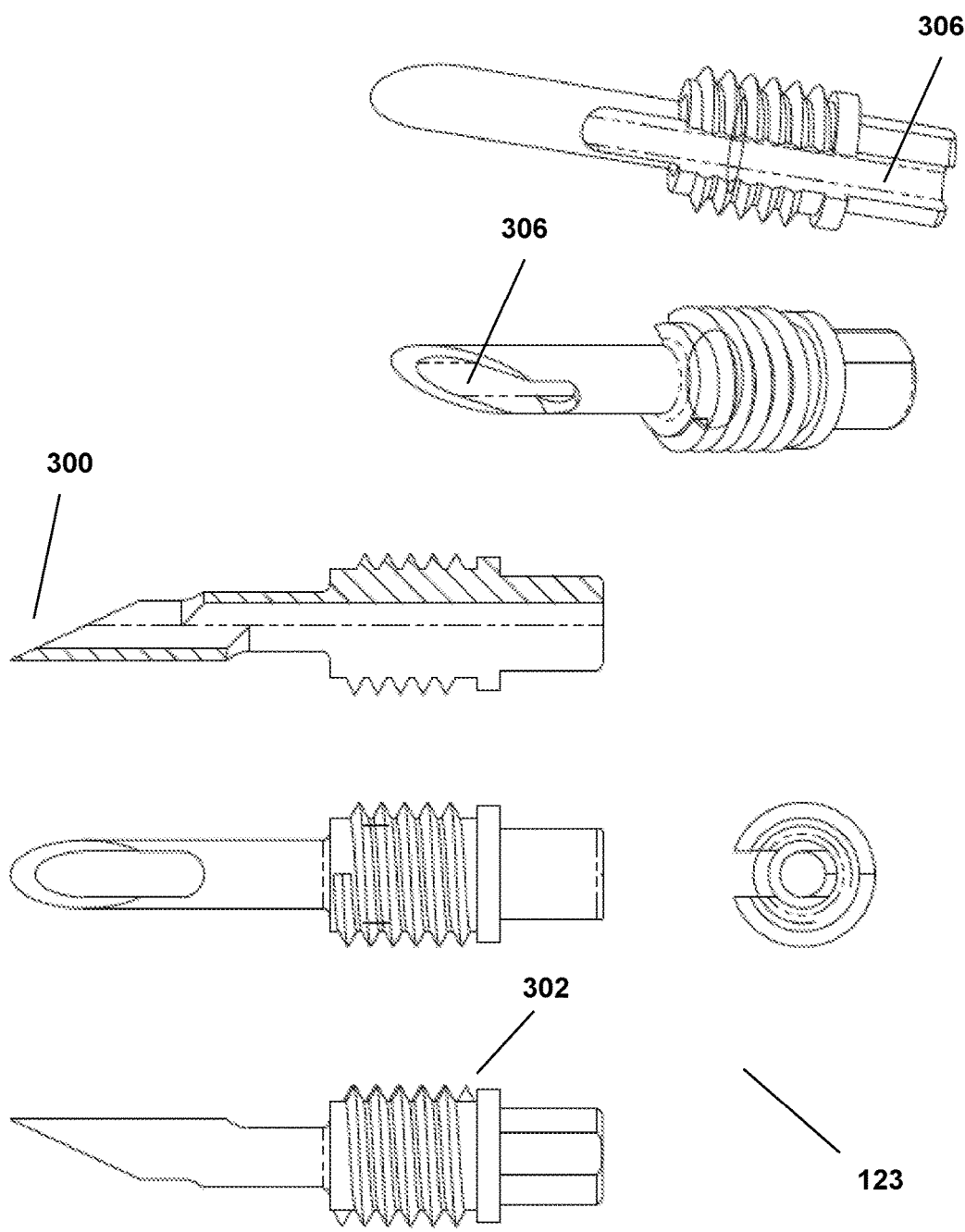
FIG. 32: An illustration of another sharp-ended spike of the coffee making device described herein, which includes a cut-out side that begins at the tip of the spike (and has a separate cut-out portion on the other side of the spike that begins near the middle and ends at the base of the spike).
Figure 33:
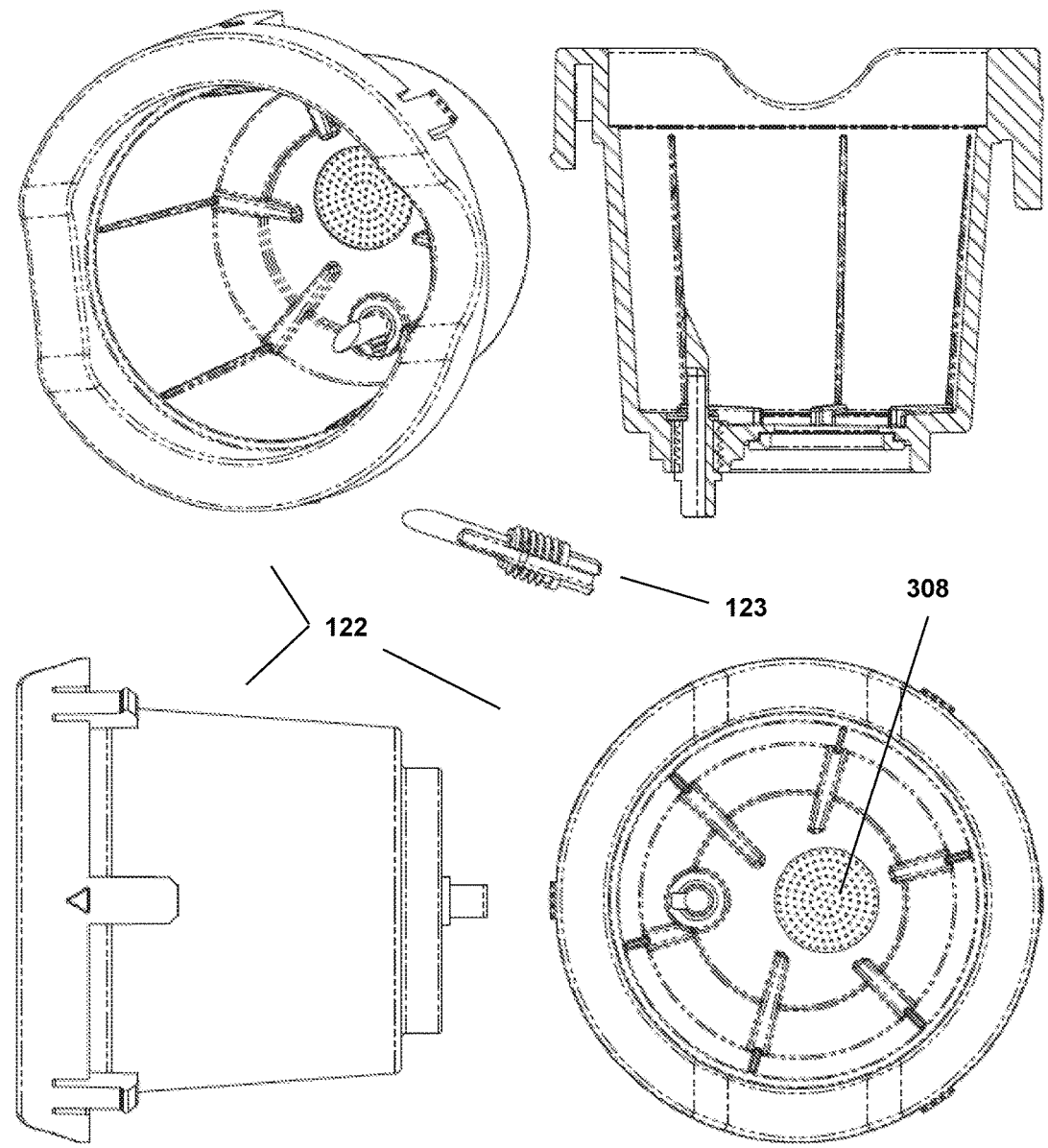
FIG. 33: An illustration of a basket that receives a coffee cartridge as described herein, which includes the sharp-ended spike of FIG. 32.
Figure 34:
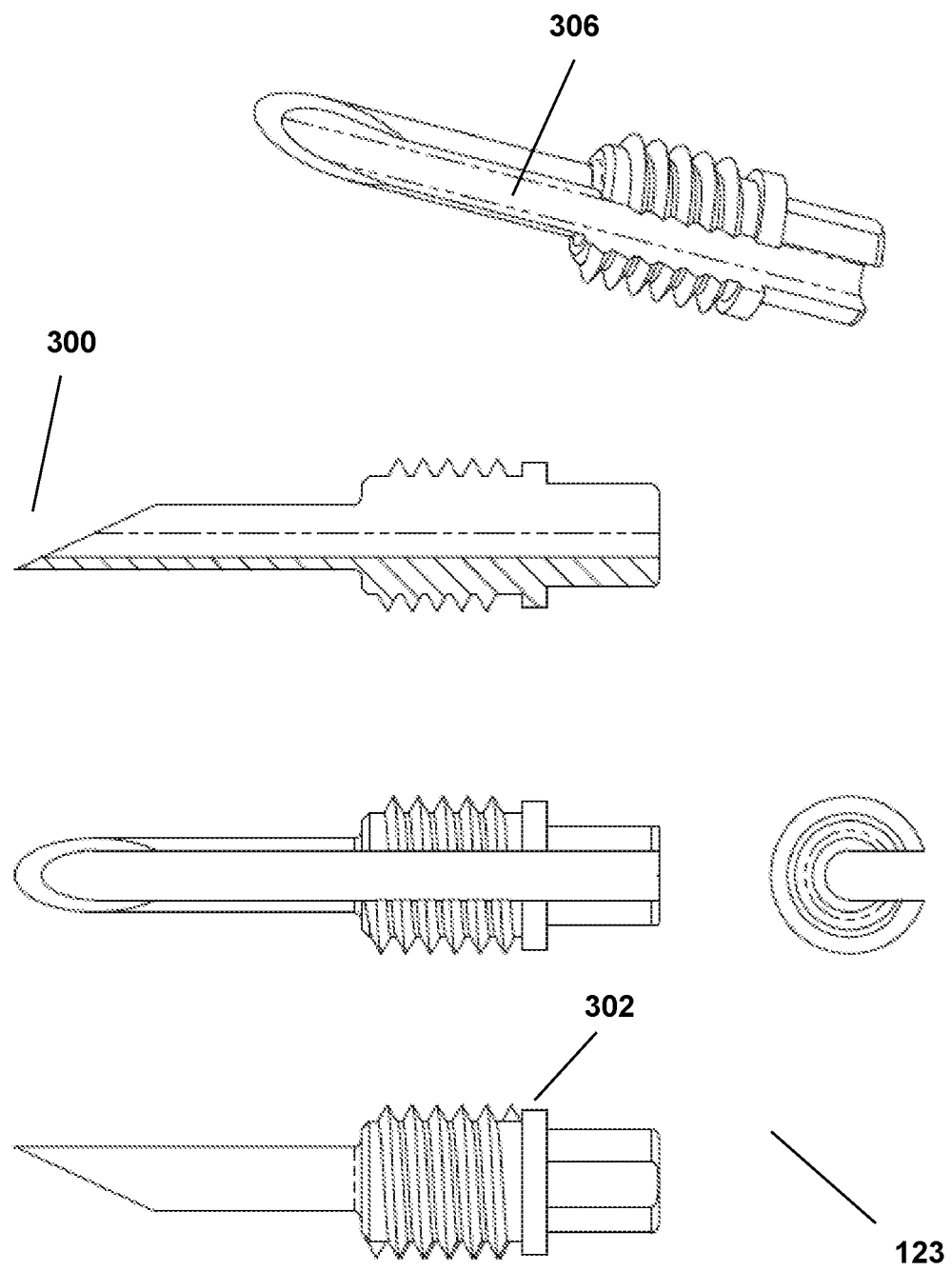
FIG. 34: An illustration of another sharp-ended spike of the coffee making device described herein, which includes a cut-out side that begins at the tip of the spike and ends at the base of the spike.
Figure 35:
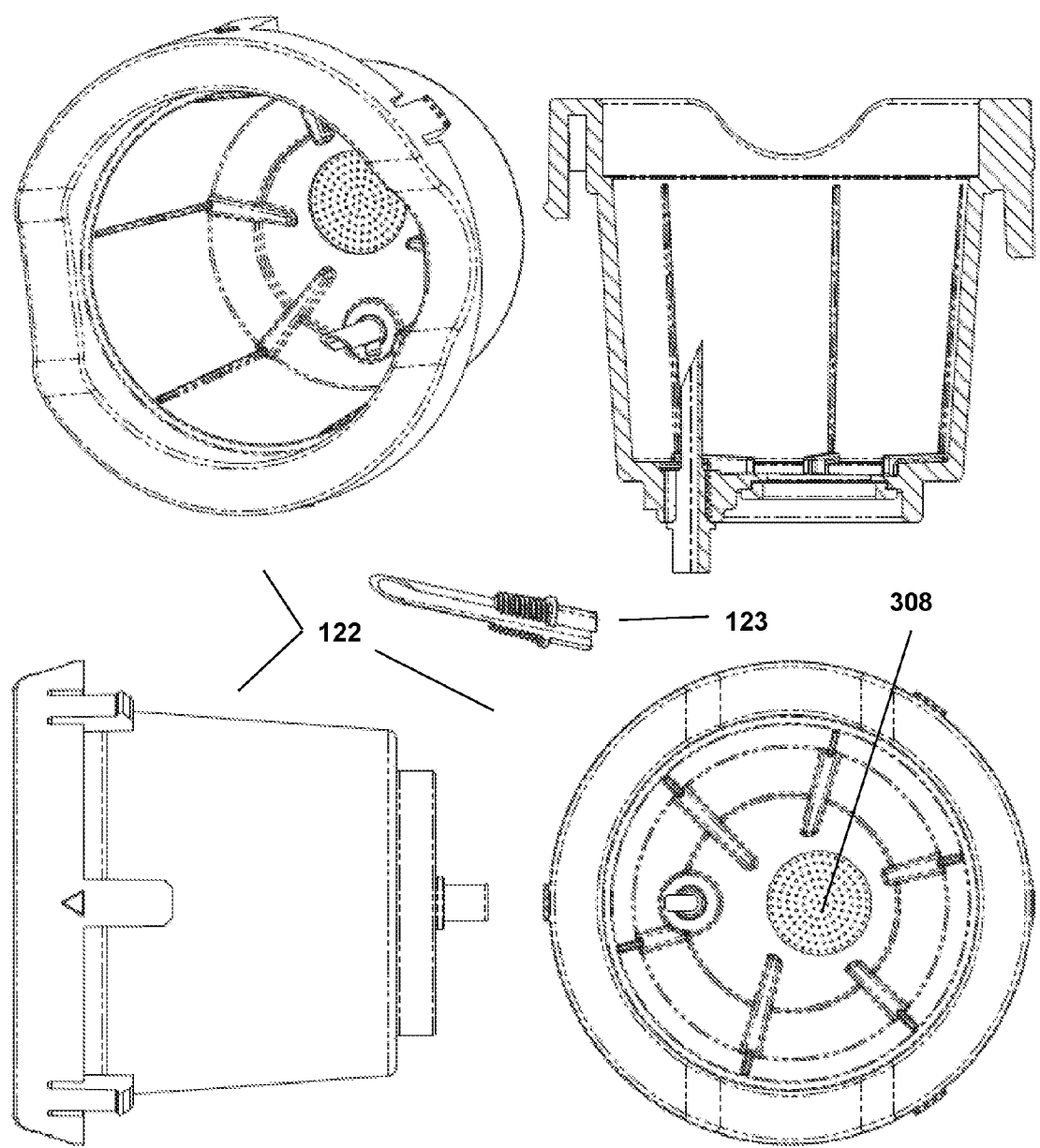
FIG. 35: An illustration of a basket that receives a coffee cartridge as described herein, which includes the sharp-ended spike of FIG. 34.
Figure 36:
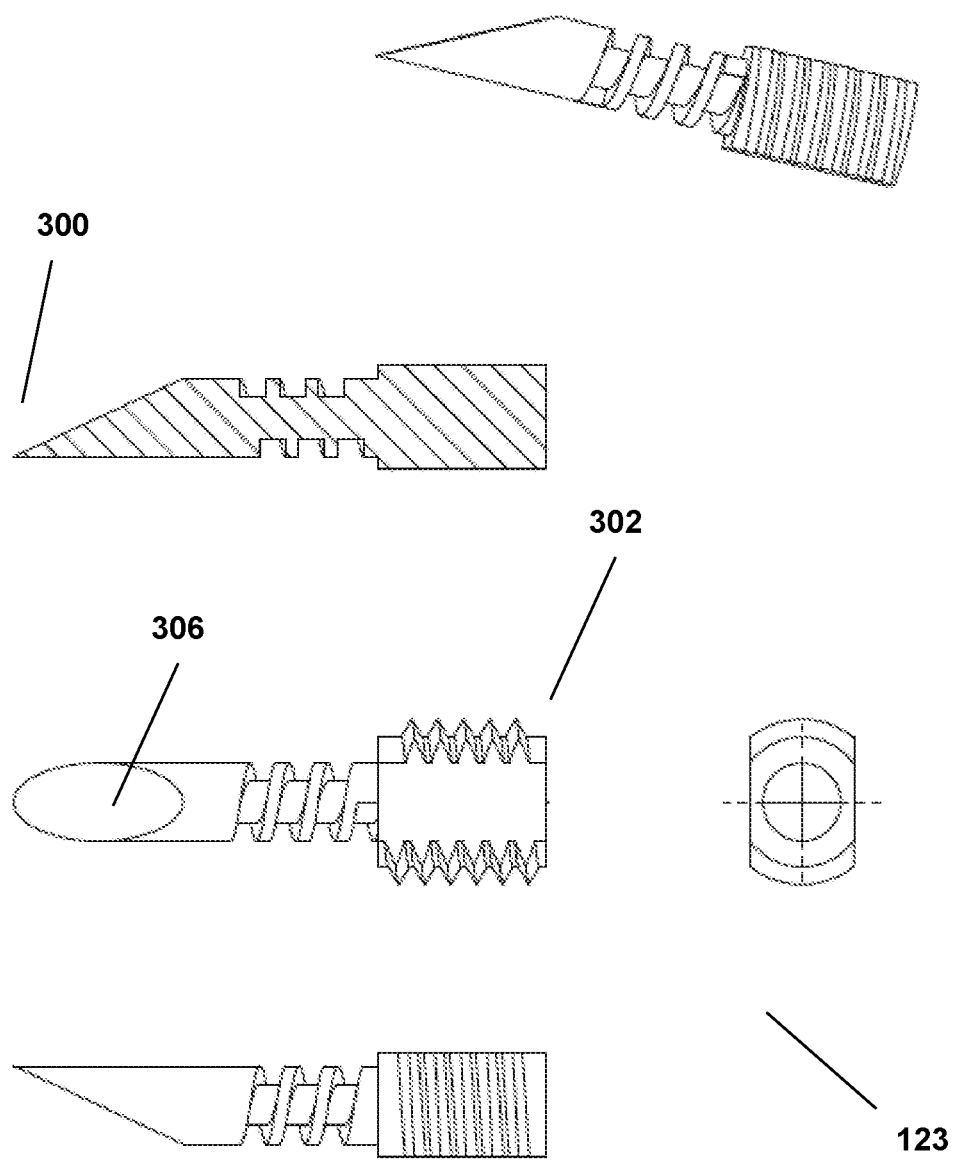
FIG. 36: An illustration of another sharp-ended spike of the coffee making device described herein, which includes a middle area that exhibits a continuously winding protrusion.
Figure 37:
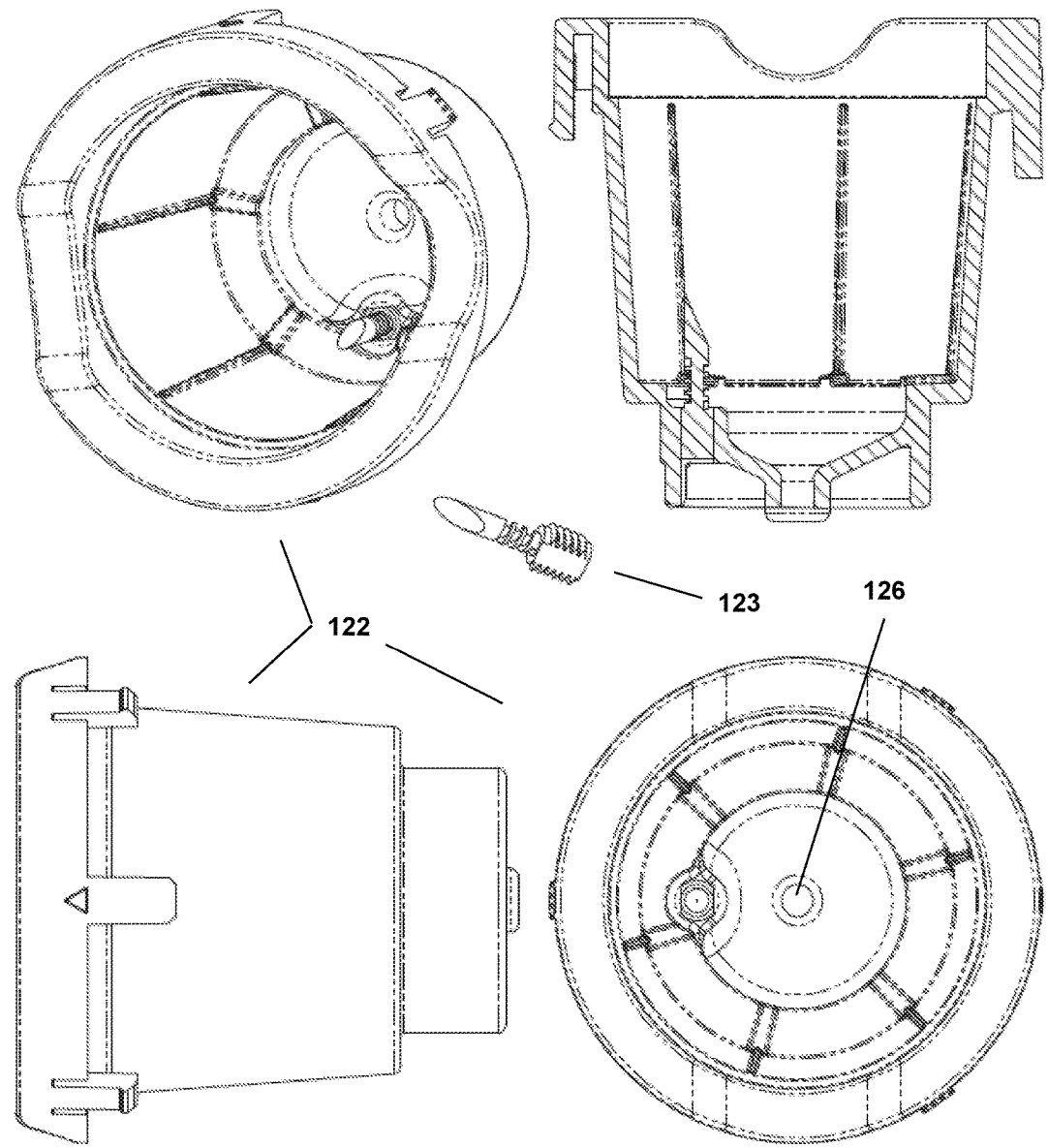
FIG. 37: An illustration of a basket that receives a coffee cartridge as described herein, which includes the sharp-ended spike of FIG. 36.
Figure 38:
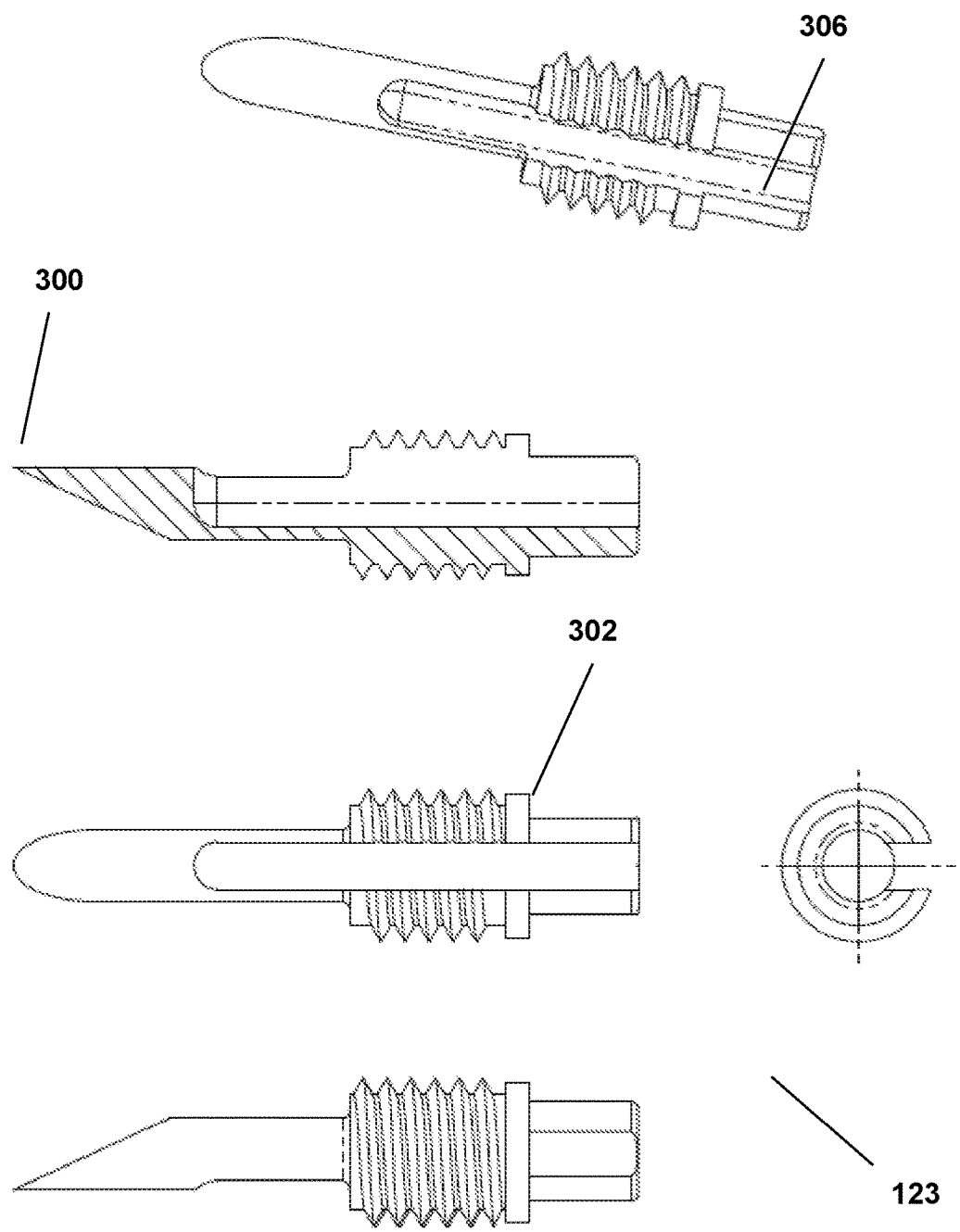
FIG. 38: An illustration of another sharp-ended spike of the coffee making device described herein, which includes a cut-out side that begins short of the tip of the spike and ends at the base of the spike.
Figure 39:
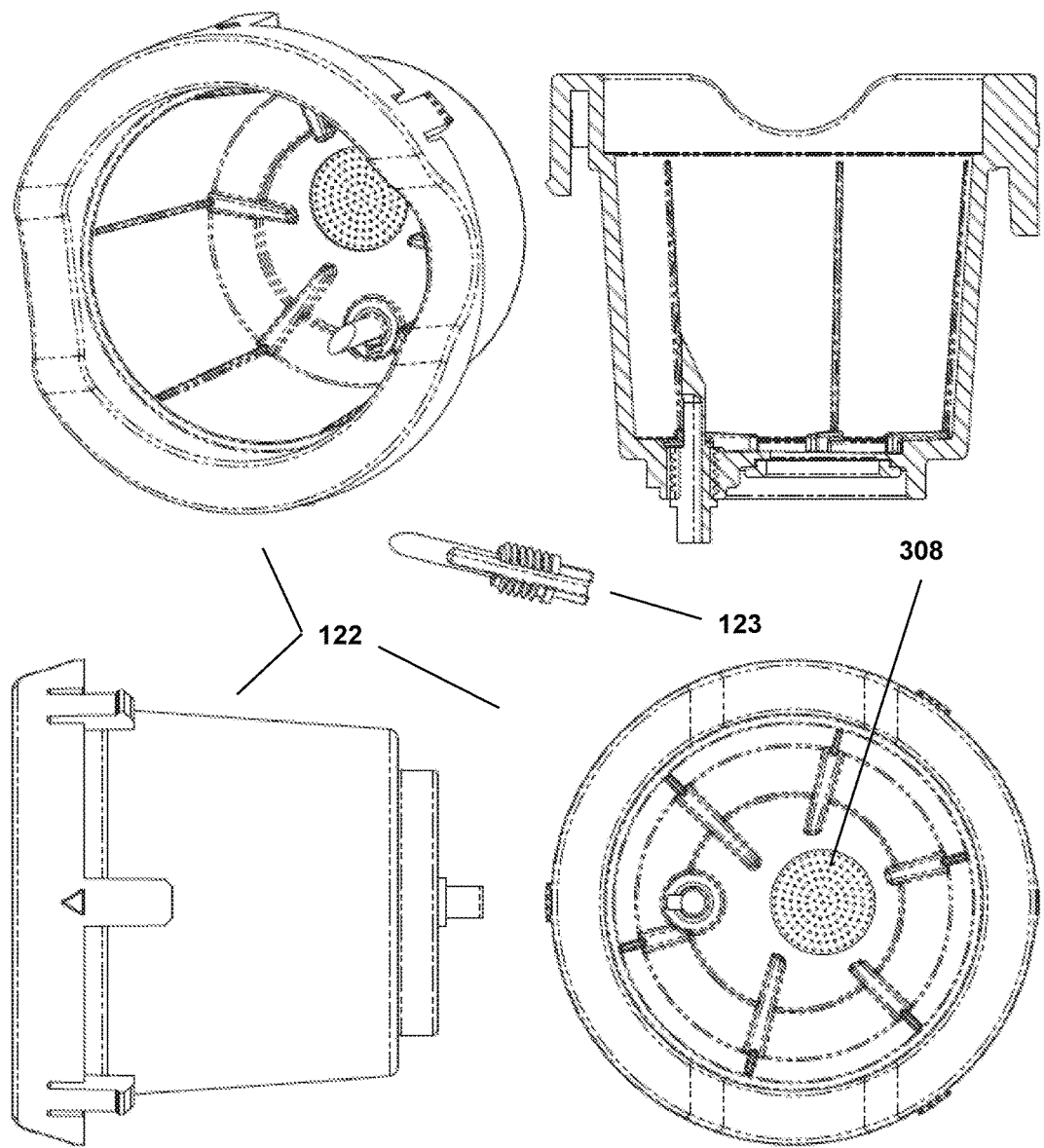
FIG. 39: An illustration of a basket that receives a coffee cartridge as described herein, which includes the sharp-ended spike of FIG. 38.
Figure 40:
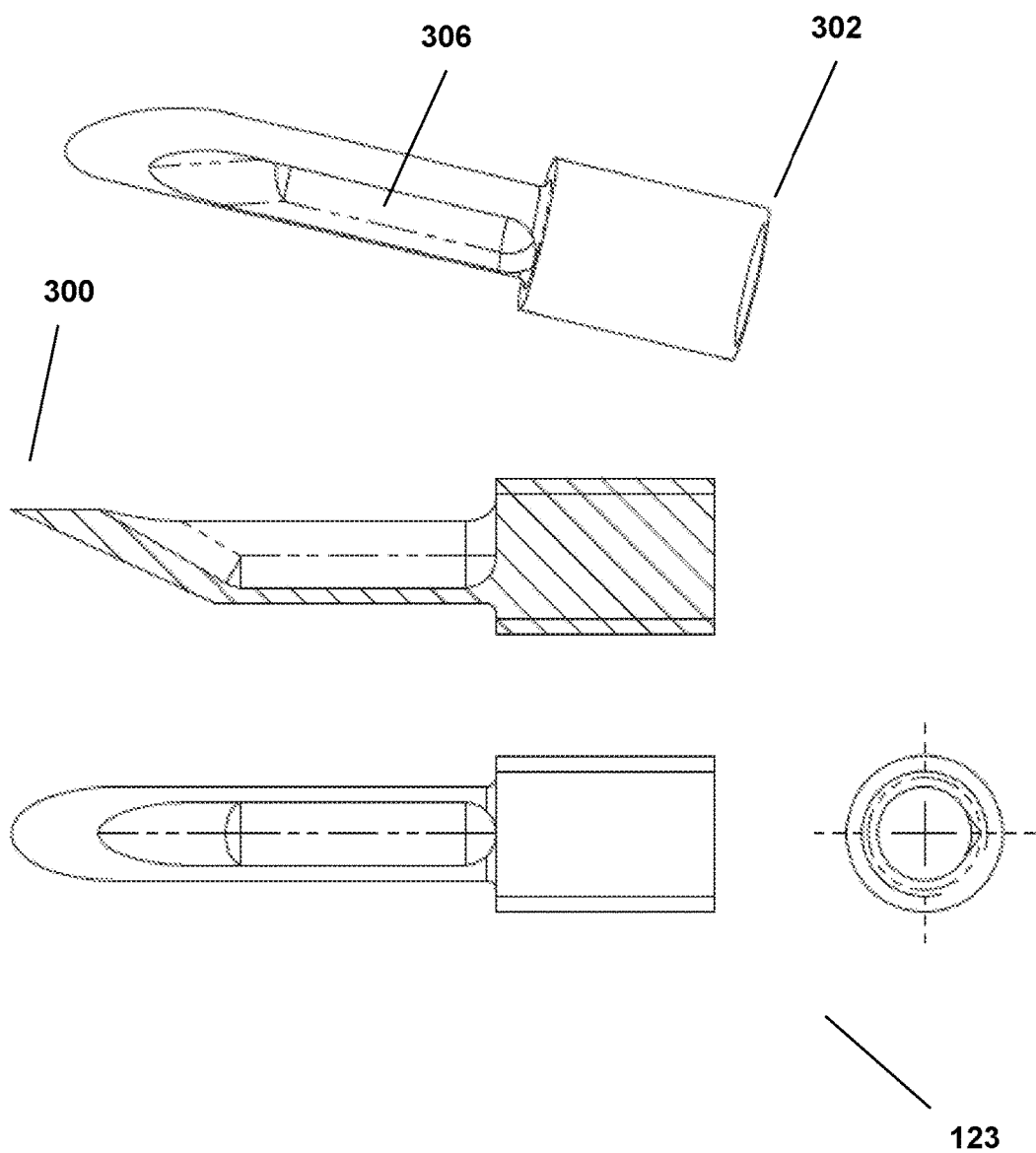
FIG. 40: An illustration of another sharp-ended spike of the coffee making device described herein, which includes an aperture that begins near a threaded portion and ends prior to the tip of the spike.
Figure 41:
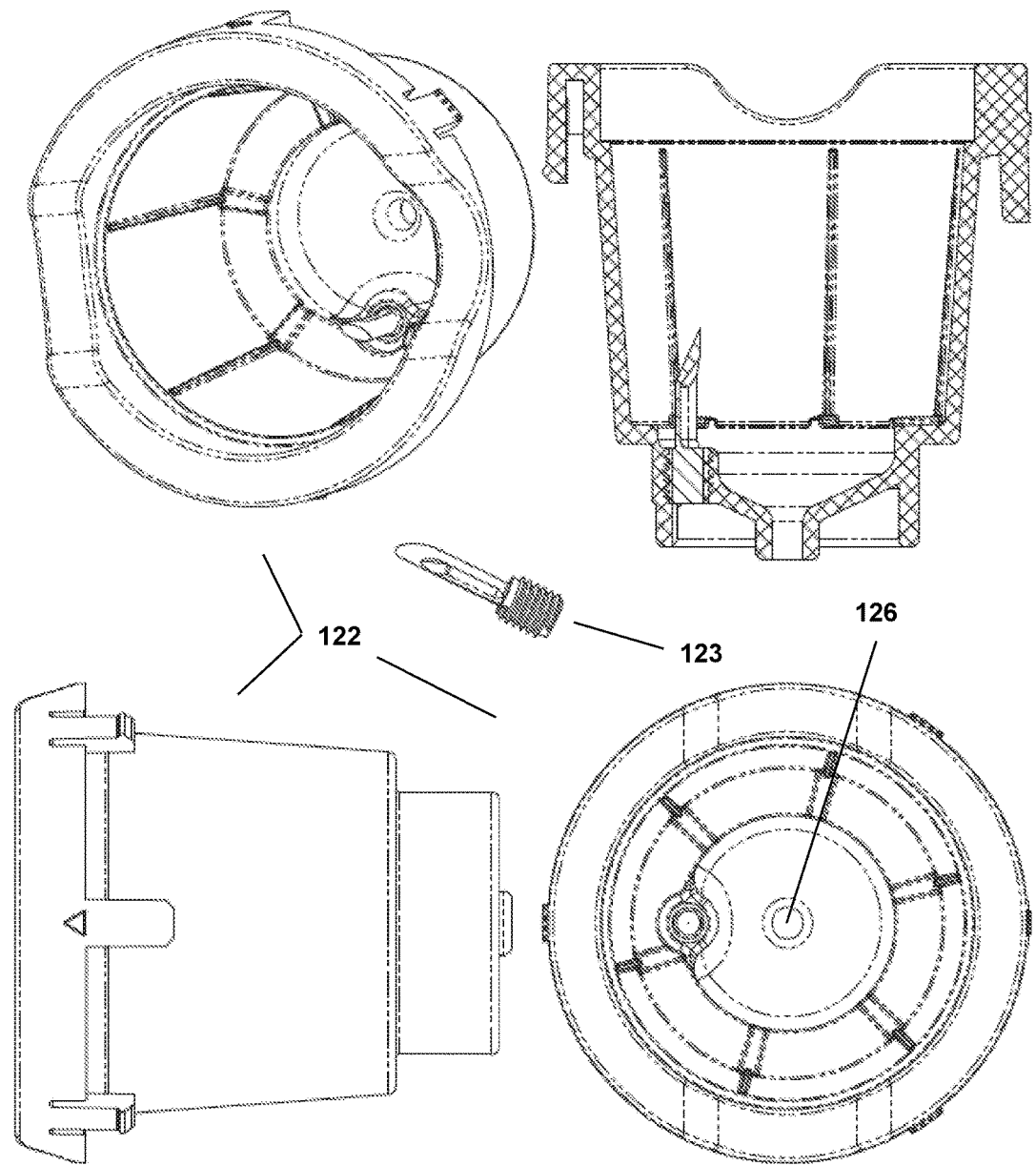
FIG. 41: An illustration of a basket that receives a coffee cartridge as described herein, which includes the sharp-ended spike of FIG. 40.
Figure 42:
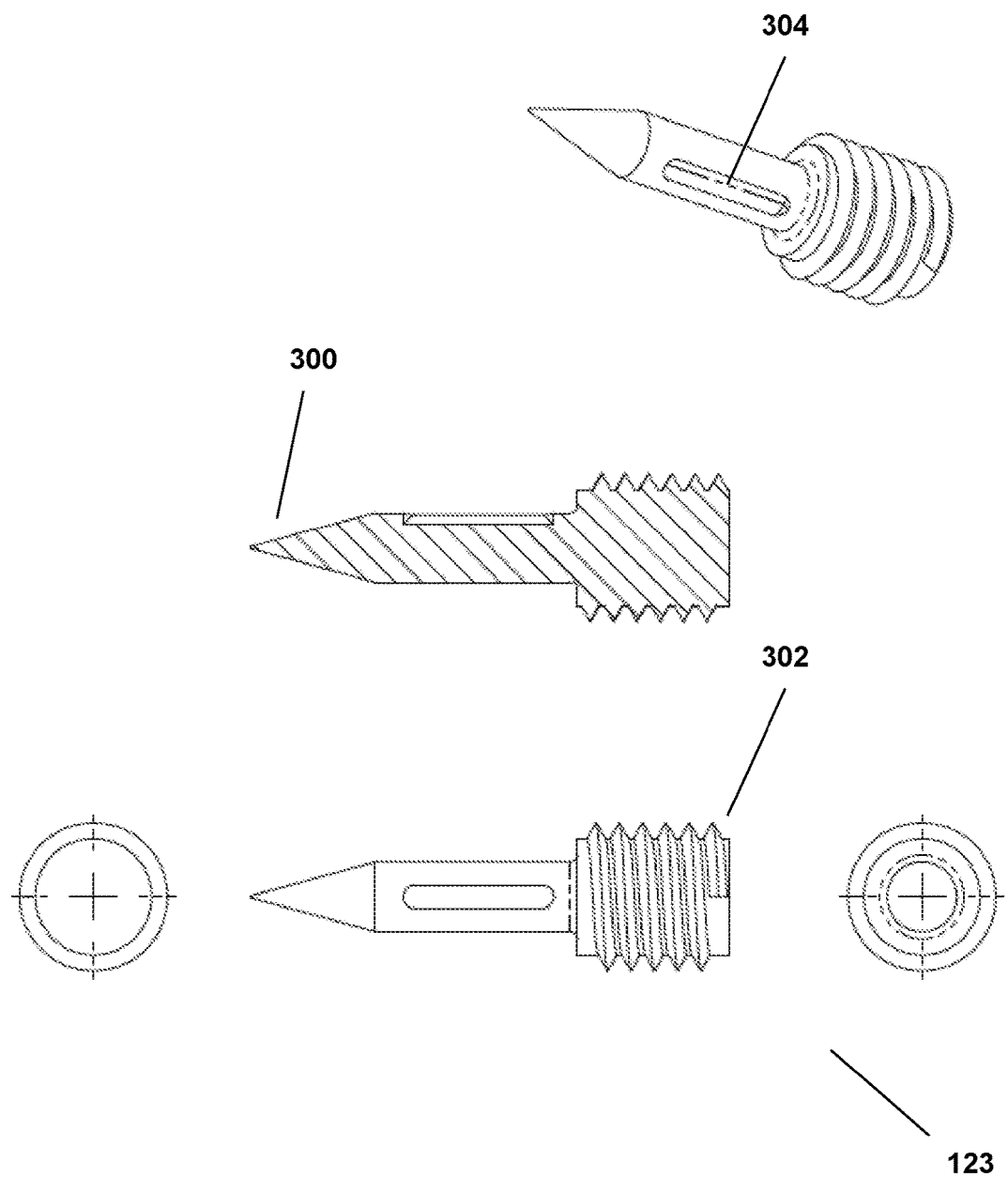
FIG. 42: An illustration of another sharp-ended spike of the coffee making device described herein, which comprises a conical tip and includes an aperture that begins near a threaded portion and ends prior to the tip of the spike.
Figure 43:
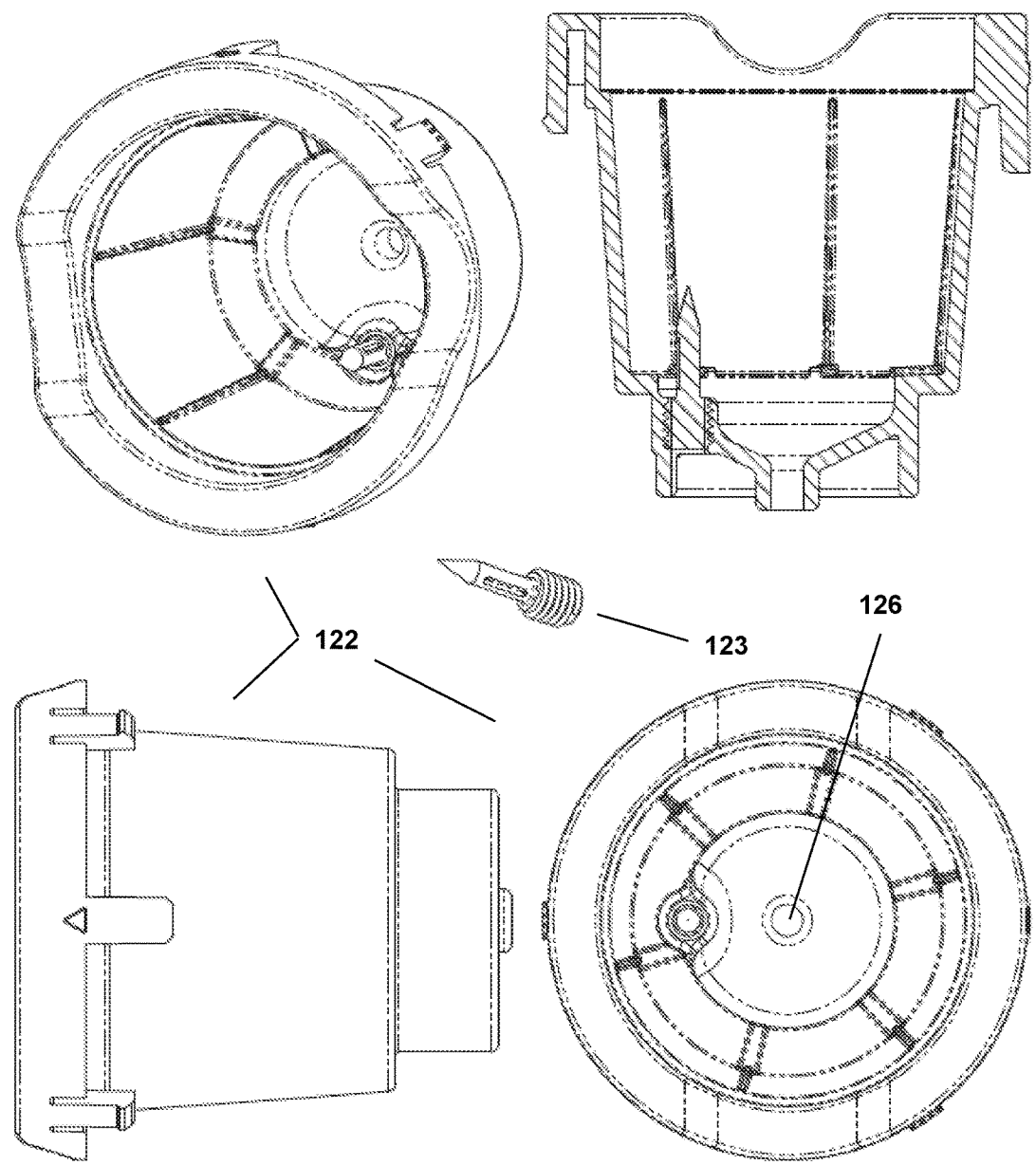
FIG. 43: An illustration of a basket that receives a coffee cartridge as described herein, which includes the sharp-ended spike of FIG. 42.
Figure 44:
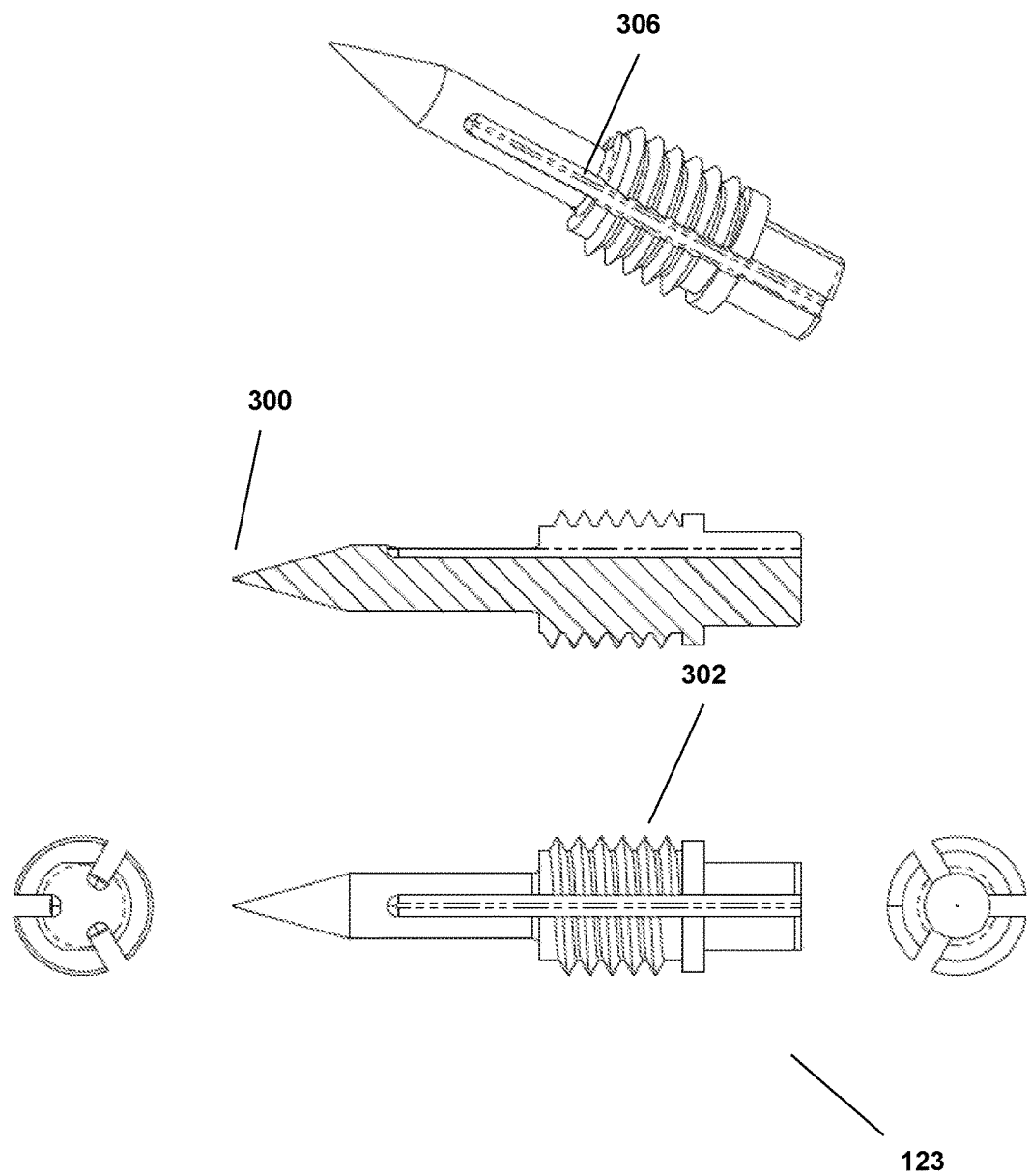
FIG. 44: An illustration of another sharp-ended spike of the coffee making device described herein, which comprises a conical tip and includes a cut-out side that begins short of the tip of the spike and ends at the base of the spike.
Figure 45:
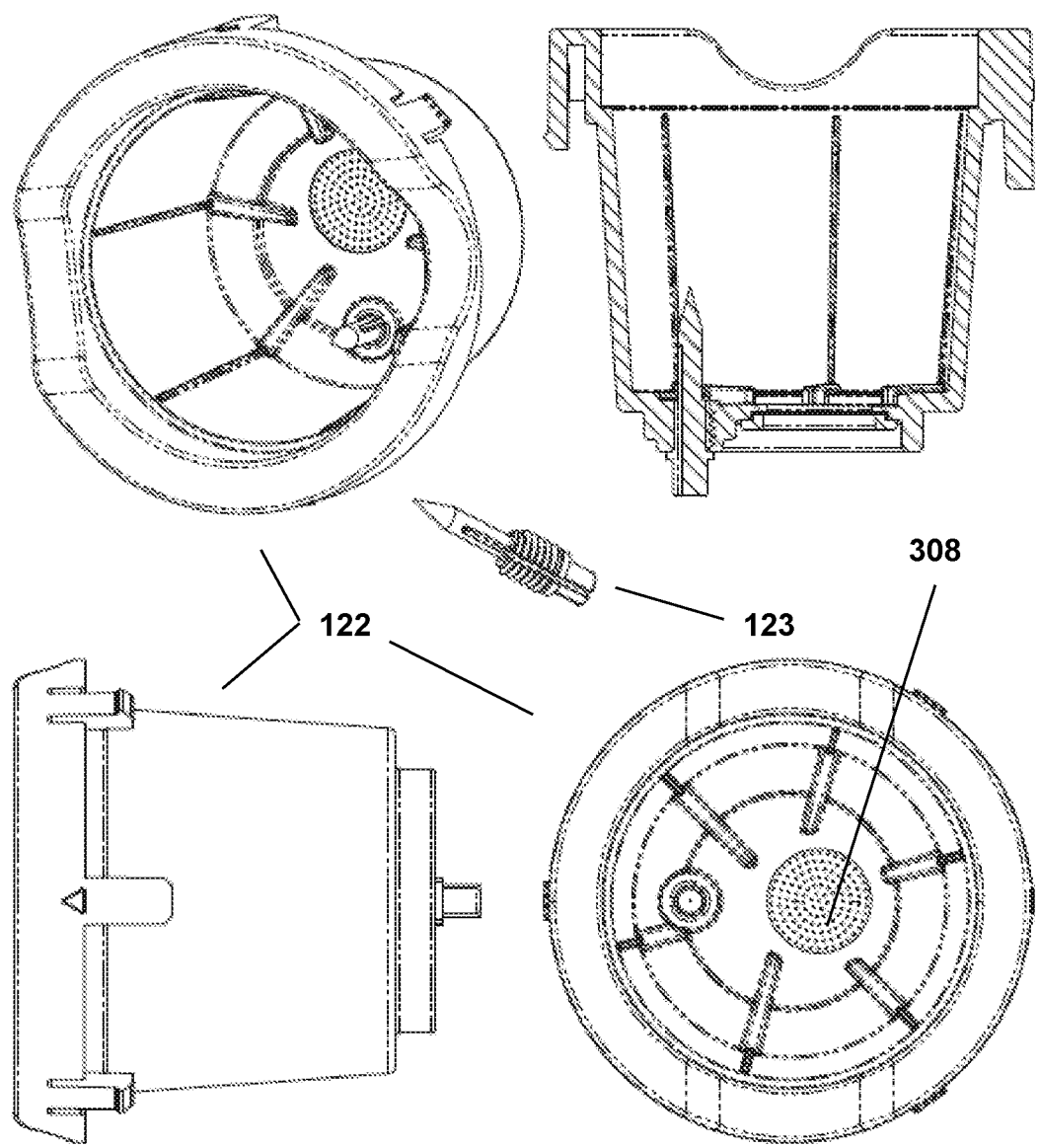
FIG. 45: An illustration of a basket that receives a coffee cartridge as described herein, which includes the sharp-ended spike of FIG. 44.

According to still further embodiments, and referring to FIG. 22, the invention provides that the cold tank 30 will preferably exhibit an approximately rectangular shape, i.e., the perimeter of the cold tank 30 exhibits a substantially rectangular perimeter and cross-section (unlike most cold tanks used in prior art water dispensers, which are typically cylindrical in shape). This configuration is also shown in FIG. 27. The invention provides that the approximately rectangular shaped cold tank 30 saves needed space within the interior 14 of the dispenser. The invention further encompasses the use of other space-saving and non-cylindrically, irregularly-shaped cold tanks 30. Still further, the cold tank 30 will preferably comprise an internal cooling evaporator 74 (instead of an externally placed evaporator as in many prior art cooling tanks). The invention provides that the internal cooling evaporator 74 will house the coolants that are used to chill the water that is contained within the cold tank 30. More particularly, the evaporator 74 will be comprised of stainless steel and copper or aluminum laminated material, with the exterior surface of the evaporator 74 (which contacts the water in the cold tank 30) being comprised of stainless steel. Still further, the invention provides that the body of the cold tank 30 will preferably be comprised of a food grade material, such as polypropylene material.

Figure 26:
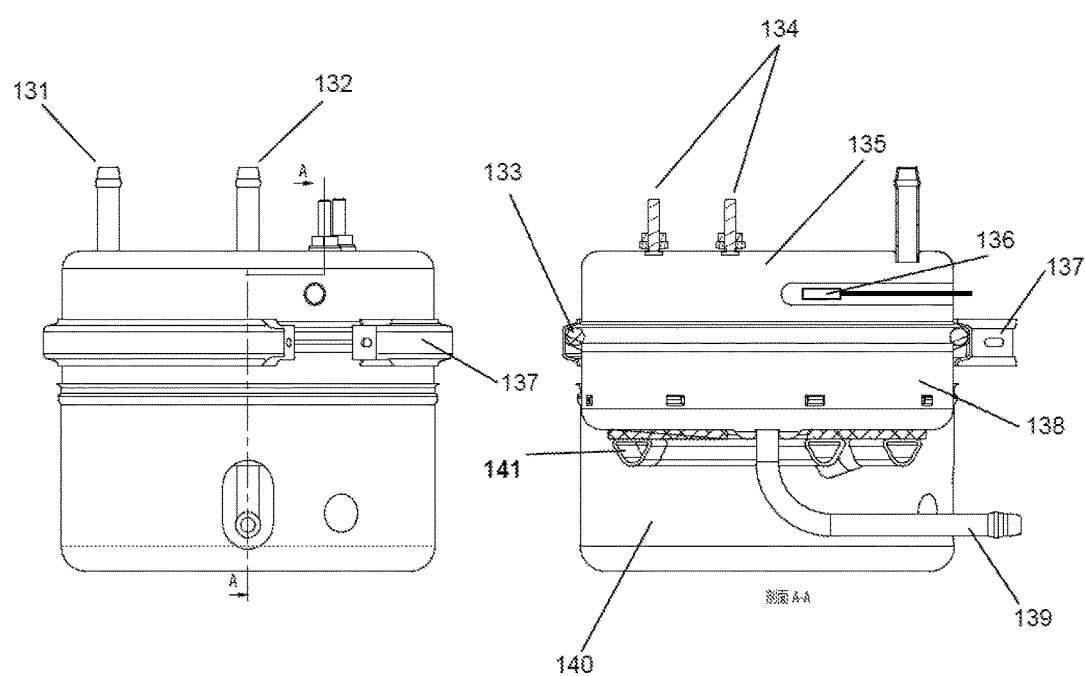
FIG. 26: An illustration of second hot tank described herein.

FIG. 26 provides an illustration of the second hot tank 26 described herein. According to certain embodiments, the second hot tank 26 may hold about 600 mL of water—and may be provided with up to about 1500 watts to heat the water contained therein. The invention provides that the second hot tank 26 may have a lower half 138 and an upper half 135, and comprise an intake water pipe 139 (which receives water from the first hot tank 26); an external heating element 141; a safety cover 140; a thermostat well 136 for an electronic temperature sensor/thermostat; an O-ring seal 133; a clamp 137; electronic sensors 134 for monitoring whether the hot tank 26 is full (as described herein); a vent/steam return line 131 (configured to return air and steam back to the cold tank 30); and a water-exit port 132 that is used to deliver water to the coffee making device 24. The invention provides that the hot tank 26 may alternatively be welded together without a clamp 137 and, furthermore, may include a mechanical thermostat (instead of an electronic thermostat). In addition, as explained herein in relation to certain alternative embodiments, the hot tank 26 may comprise an internal heating element (in replacement of or in addition to the external heating element 141).

Referring now to FIGS. 3, 4, 10-12, 14, 15, 18, and 19, in certain additional embodiments, the invention provides that the water dispensers of the present invention may comprise only a single hot tank 80. The water dispensers in such embodiments will be similar to those described above, with the exception that the dispensers will include one hot tank 80 instead of two separate tanks 26,28. According to such embodiments, the single hot tank 80 will receive water from the cold tank 30. The water line between the cold tank 30 and hot tank 80 will include a flow meter 43A and water pump 43B. The invention provides that when cold water is pumped from the cold tank 30 into the hot tank 80, the one-way valve 43 will prevent such water from back-flowing into the cold tank 30. In addition, the one-way valve 43 will close upon receiving a signal that water is being transferred from the hot tank 80 to the coffee making device 24 (in certain alternative embodiments, the one-way valve 43 may be a solenoid valve).

According to such embodiments, the water line between the hot tank 80 and the coffee making device 24 may also include a one-way spring-loaded valve 33, which may exist in a "closed" position, unless a user instructs the dispenser to produce a cup of coffee as described herein, in which case the water pressure (provided by the water pump 43B) will cause the one-way spring-loaded valve 33 to open and allow a defined volume of water to be transferred from the hot tank 80 and into the coffee making device 24 (although a one-way spring-loaded valve 33 may be employed as described, the invention provides that a solenoid valve may also be used). Still further, as in the other embodiments described herein, the water dispenser will include a pump 43B, which is configured to pump water from the cold tank 30 and into the hot tank 80, with a flow meter 43A located in such water line between the cold tank 30 and hot tank 80, with the flow meter being configured to monitor and restrict the volume of water that is transferred from the cold tank 30 and into the hot tank 80, to the volume of water that corresponds to, and is needed to produce, the desired volume of coffee beverage.

Referring to FIG. 13A-13G, the hot tank 80 may comprise one or more internally mounted thermostats 90 that are configured to monitor the temperature of the water contained therein, and communicate such information to the control board 58 (in certain alternative embodiments, the thermostats 90 may be externally mounted). In the hot tank 80, the water is heated within a reasonable amount of time, e.g., via a set of electric heating coils 64 (which may be embedded within, connected to, or brazed to a side of the hot tank 80) to a final temperature that preferably ranges between 93 and 96 degrees Celsius.

Figure 13A:
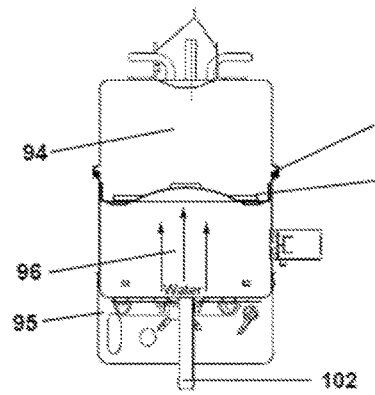
FIG. 13A: An illustration of a hot tank that includes a baffle, which can be used in the water dispensers described herein.
Figure 13B:
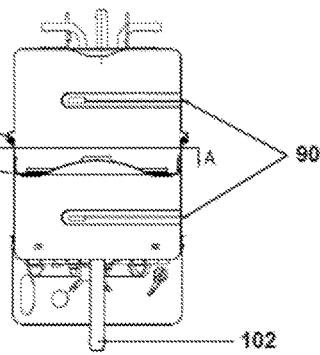
FIG. 13B: Another illustration of the hot tank of FIG. 13A.
Figure 13G:
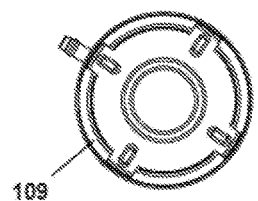
FIG. 13G: A cross-sectional view of the hot water tank, showing the hot water tank baffle described herein.
Figure 13C:
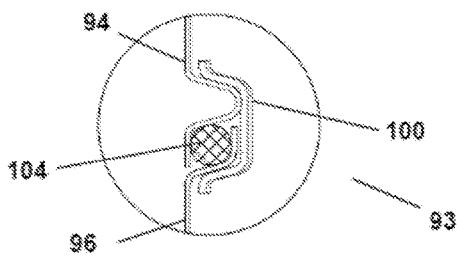
FIG. 13C: A side cross-sectional view of a ring seal and a clamp, which are holding together the upper and lower portions of the hot water tank.
Figure 13D:
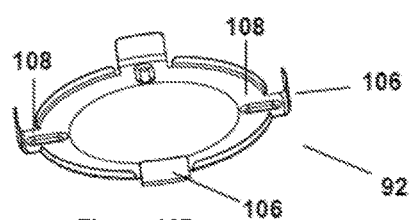
FIG. 13D: A bottom perspective view of the hot tank baffle described herein.
Figure 13E:
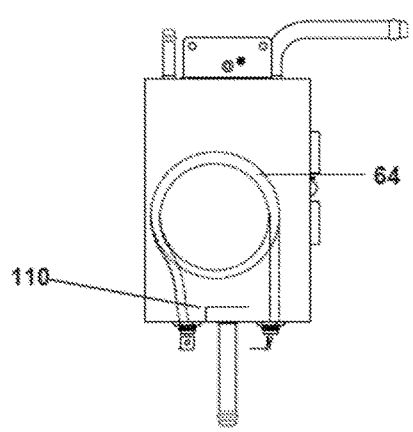
FIG. 13E: An illustration of the interior portion of a hot tank, showing a heating coil, which can be used in the water dispensers described herein.
Figure 13F:
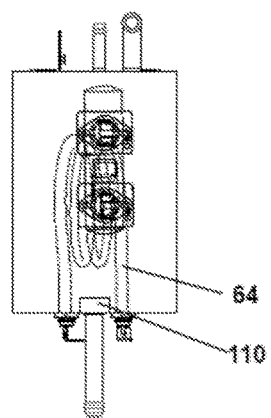
FIG. 13F: Another illustration of the hot tank of FIG. 13E.
Figure 14:
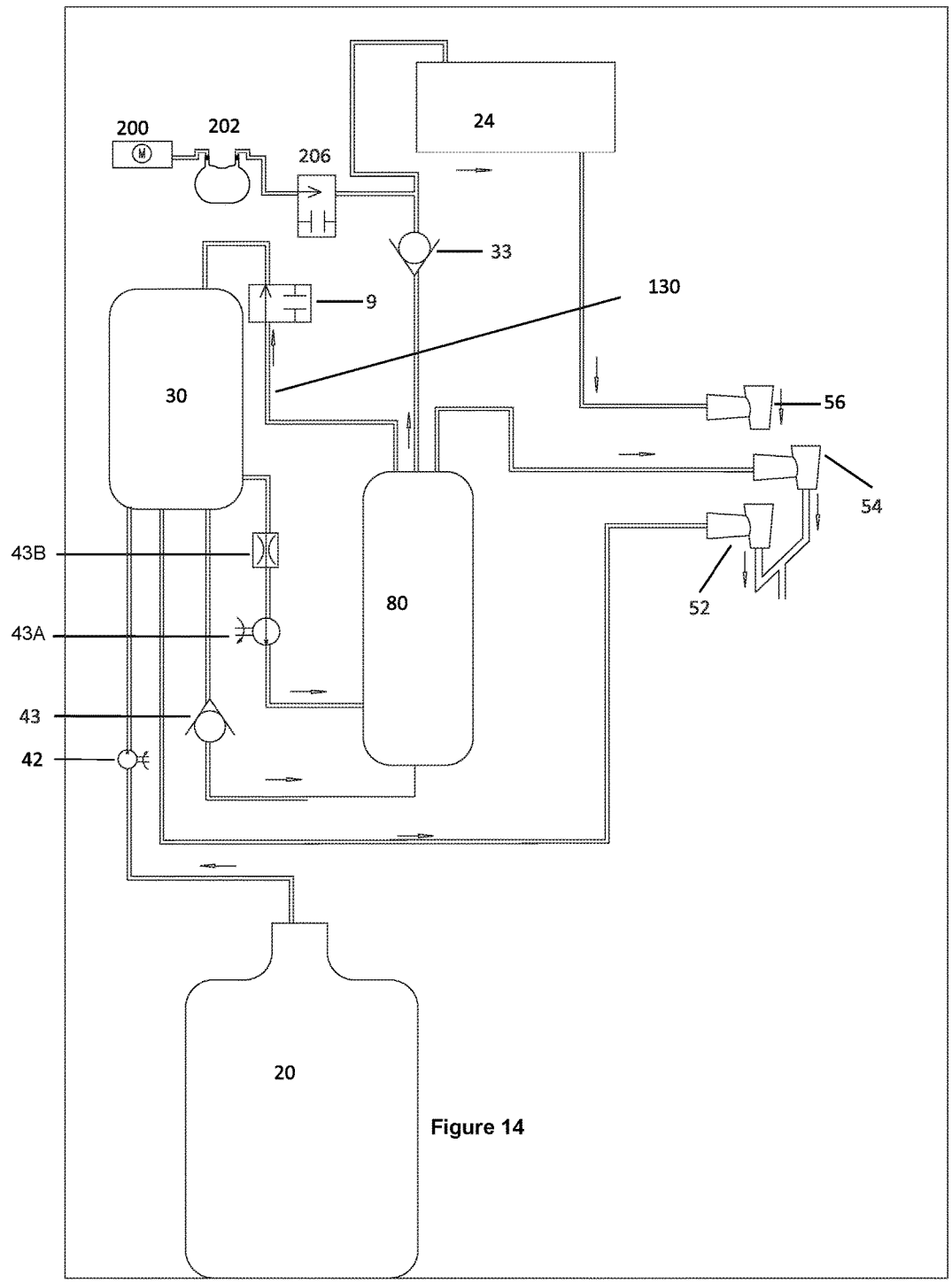
FIG. 14: A diagram that illustrates the arrangement of the compressed (expandable) air storage tank described herein, along with the corresponding air pump, solenoid valve, and air tube (in a dispenser having one hot tank), which are configured to deliver a volume of air (at high pressure) to the coffee making device to expel any residual water after a hot beverage is produced.
Figure 15:
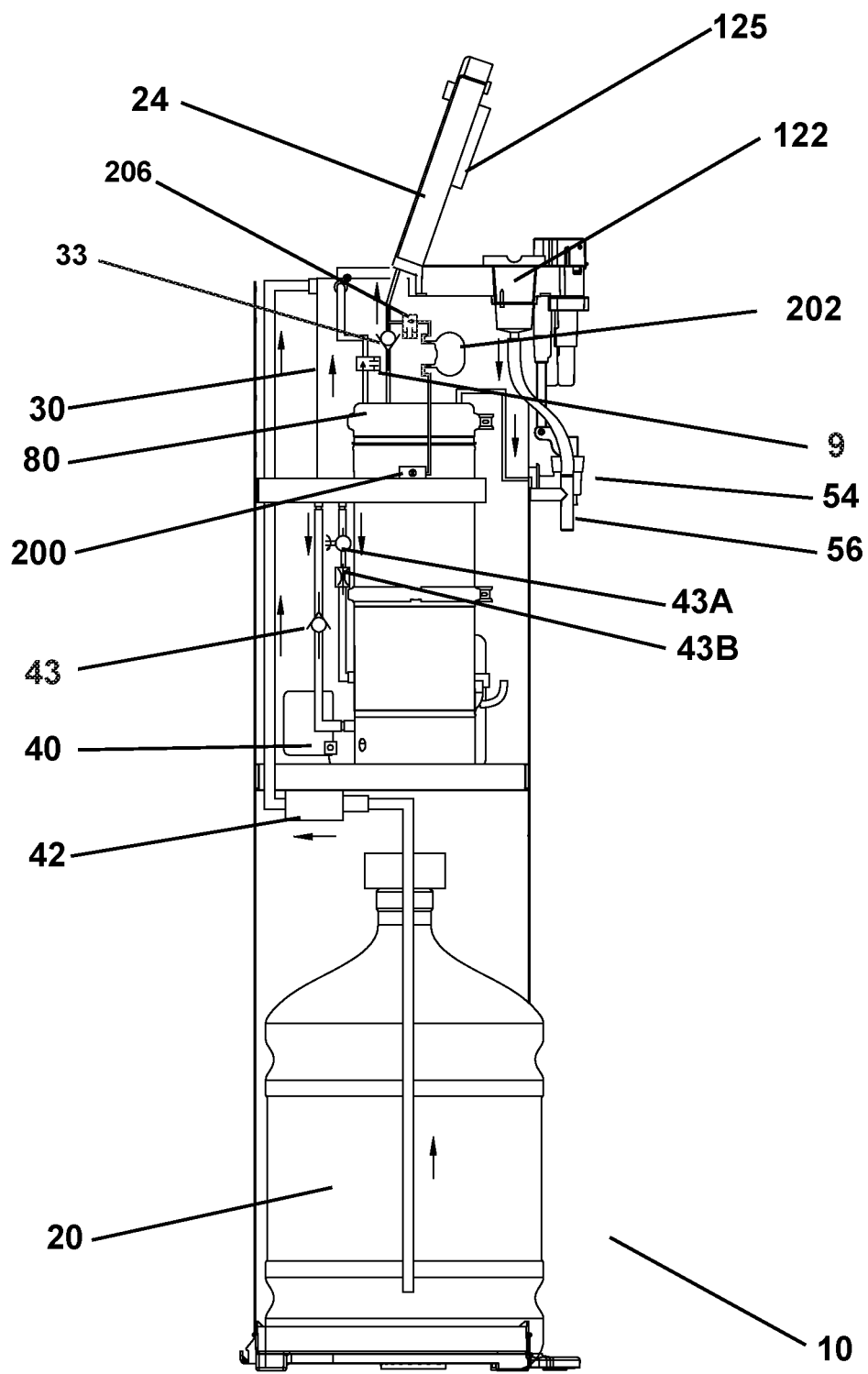
FIG. 15: A side interior (cross-sectional) view of a water dispenser having one hot tank of FIG. 14, which illustrates the arrangement of the compressed (expandable) air storage tank described herein, along with the corresponding air pump, solenoid valve, and air tube.
Figure 16:
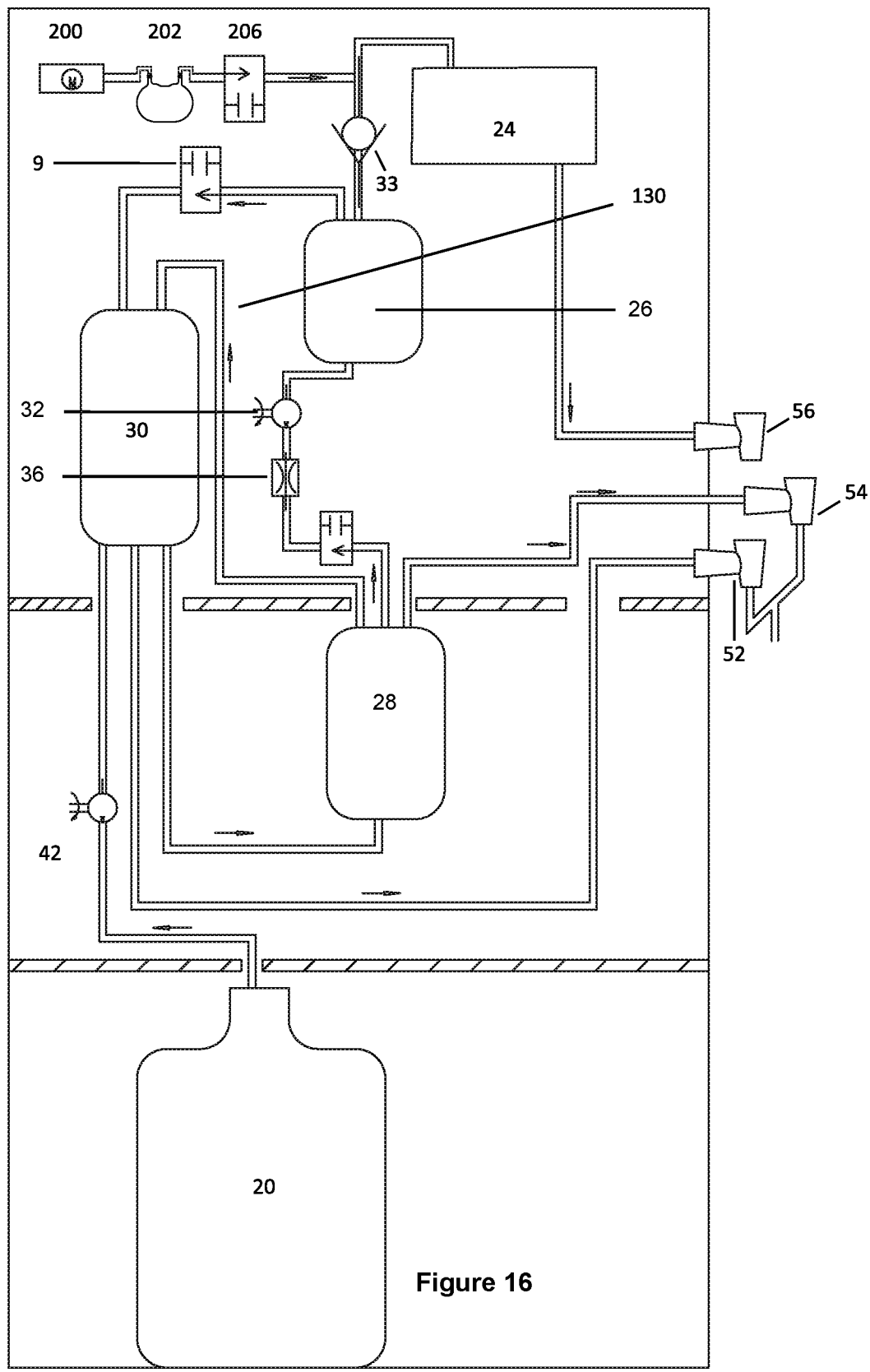
FIG. 16: A diagram that illustrates the arrangement of the compressed (expandable) air storage tank described herein, along with the corresponding air pump, solenoid valve, and air tube (in a dispenser having two hot tanks), which are configured to deliver a volume of air (at high pressure) to the coffee making device to expel any residual water after a hot beverage is produced.
Figure 17:
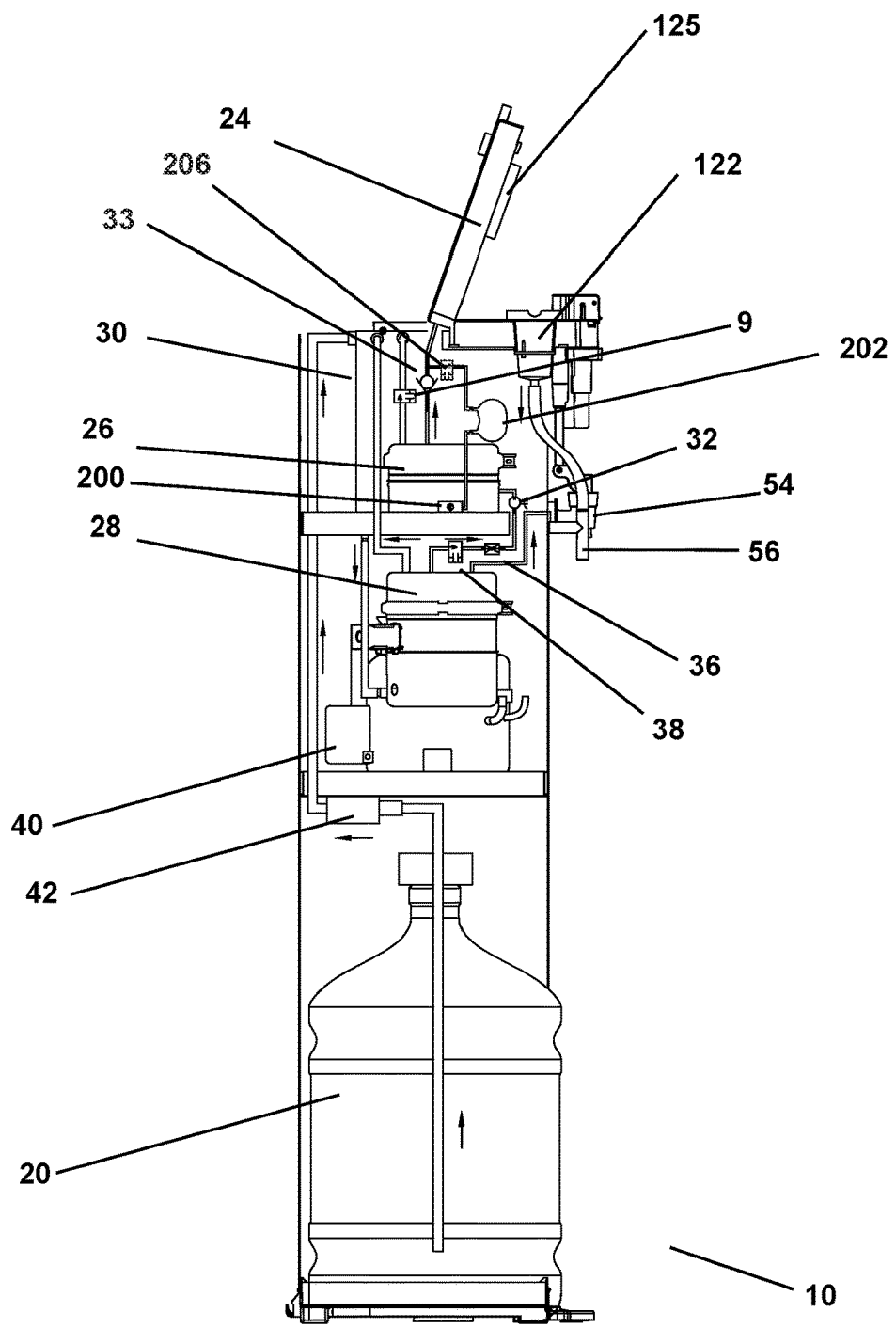
FIG. 17: A side interior (cross-sectional) view of a water dispenser having two hot tanks of FIG. 16, which illustrates the arrangement of the compressed (expandable) air storage tank described herein, along with the corresponding air pump, solenoid valve, and air tube.
Figure 18:
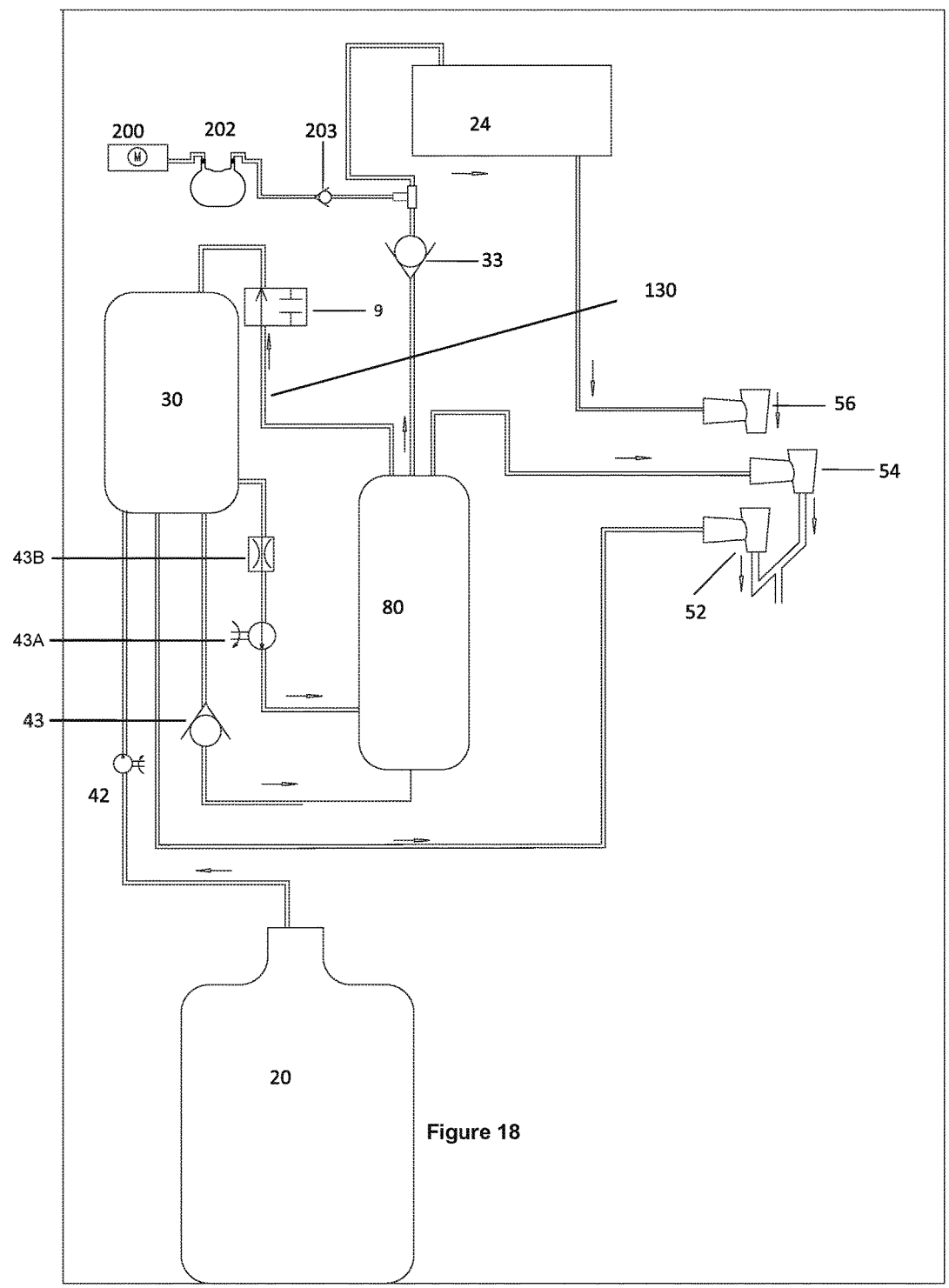
FIG. 18: A diagram that illustrates the arrangement of the compressed (expandable) air storage tank described herein, along with the corresponding air pump, one-way valve, and air tube (in a dispenser having one hot tank), which are configured to deliver a volume of air (at high pressure) to the coffee making device to expel any residual water after a hot beverage is produced.
Figure 19:
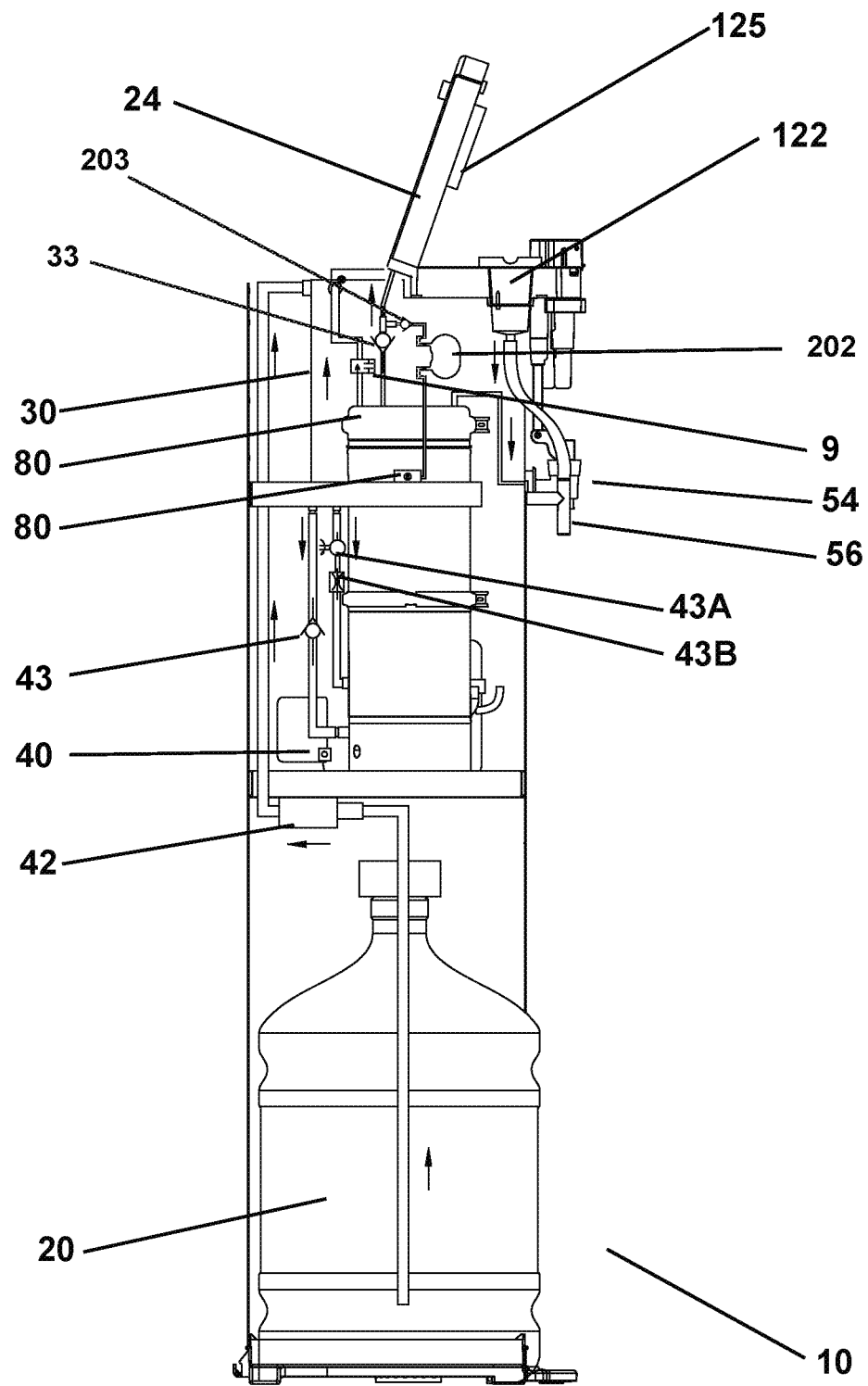
FIG. 19: A side interior (cross-sectional) view of a water dispenser having one hot tank of FIG. 18, which illustrates the arrangement of the compressed (expandable) air storage tank described herein, along with the corresponding air pump, one-way valve, and air tube.
Figure 20:
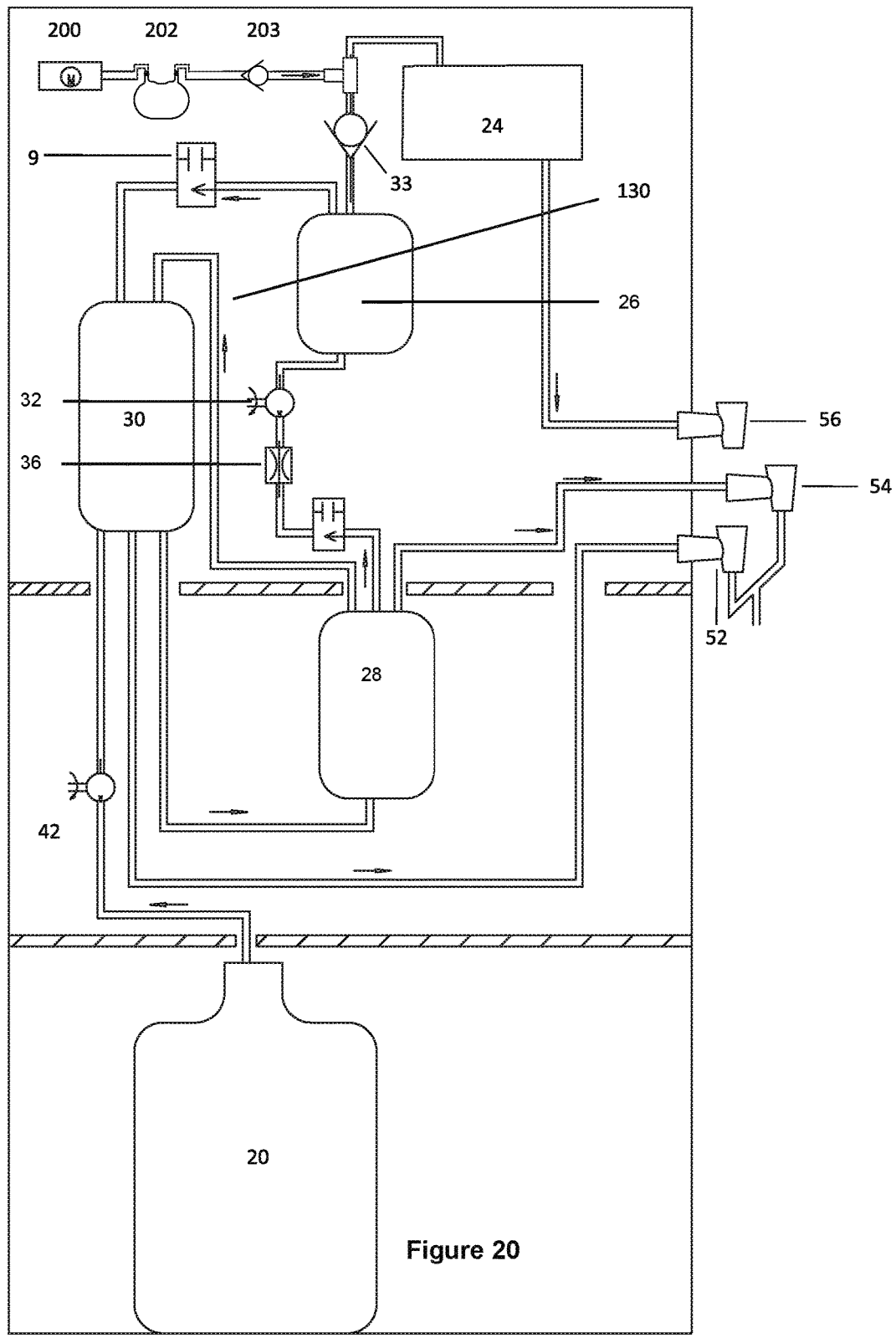
FIG. 20: A diagram that illustrates the arrangement of the compressed (expandable) air storage tank described herein, along with the corresponding air pump, one-way valve, and air tube (in a dispenser having two hot tanks), which are configured to deliver a volume of air (at high pressure) to the coffee making device to expel any residual water after a hot beverage is produced.
Figure 21:
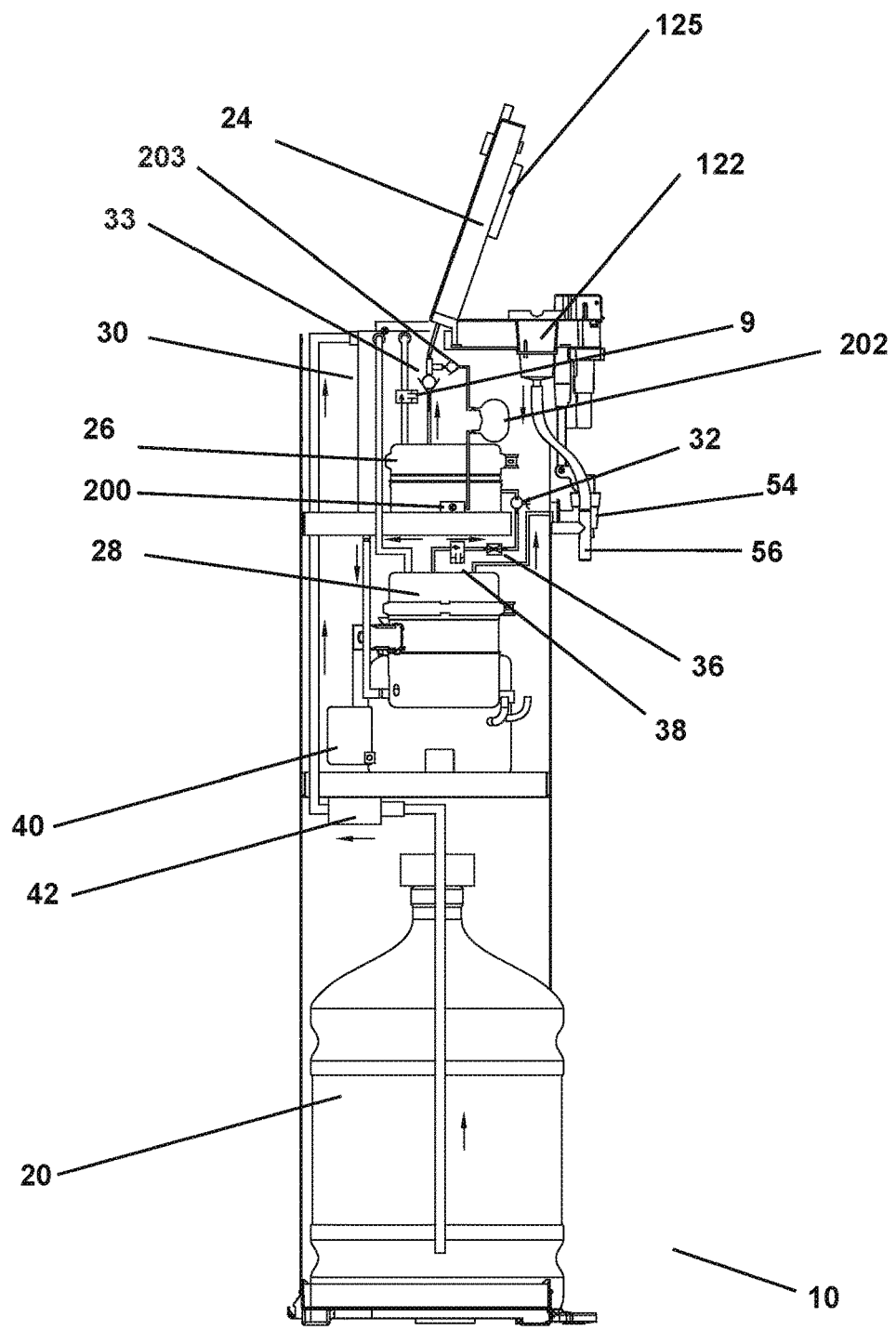
FIG. 21: A side interior (cross-sectional) view of a water dispenser having two hot tanks of FIG. 20, which illustrates the arrangement of the compressed (expandable) air storage tank described herein, along with the corresponding air pump, one-way valve, and air tube.

The invention provides that the hot tank 80 may comprise a baffle 92, which separates the interior portion of the hot tank into two separate chambers 94,96. The baffle 92 will be configured to allow water to travel from one chamber 96 to another 94, albeit slowly and gradually. The baffle 92 is configured to be located between (1) the side that is closest to the heating coils 64 and (2) the side that comprises the cold water intake area (i.e., the port 102 through which water enters the hot tank 80 from the cold tank 30). This way, the baffle 92 serves as a type of barrier between the recently injected cold water, and existing hot water, and allows the two chambers of water to gradually be mixed and heated to equilibrium. In addition, the baffle 92 is configured to minimize the mixing of hot/cold water, while the injected cold water is displacing the hot water that is being transferred to the coffee making device 24. The invention provides that the baffle 92 may exhibit a concave shape, which exhibits a perimeter that is configured to reside adjacent to the interior surface of the hot tank 80 (and may include a set of tabs 106 that are configured to mechanically position and hold the baffle 92 within the hot tank 80). The invention provides that the baffle 92 may comprise one or more apertures 109 through which water may move from one chamber 96 to another 94 of the hot tank 80 (FIG. 13G).

The invention provides that the dispensers may be configured to deliver to the water heating coils 64 (through a wattage regulator), a moderate wattage, e.g. 425-500 watts, for maintaining the water contained in the hot tank 80 at a relatively constant temperature (during periods of non-use). This moderate usage of energy will not only conserve energy, it will also avoid unwanted "kettle noise" within the hot tank. In addition, a user may select—through the control board 58—a preheat option that will instruct the heating cons 64 to activate a full wattage program (e.g., totaling 1200 watts, and up to 1500 watts), which may be employed to expedite the heating of water contained in the hot tank 80 for the purpose of making a coffee beverage (or dispensing hot water from the external tap).

Still further, the water dispensers of the present invention may comprise a power-saving "sleep option." More particularly, the control board 58 may include an interface that allows a user to specify a regular daily period of time during which the dispenser is not often used, referred to herein as the "sleep time" or "down time" (e.g., during the late night hours when most people are sleeping and not using the dispenser). During the defined "sleep time" periods, the preferred temperature(s) of the hot tank(s) described herein may drop, which will thereby save and preserve the amount of energy that is necessary to maintain the water at the "normal" elevated temperatures. For example, in the case of a single hot tank 80 embodiment, during the "sleep time," the preferred and maintained temperature of the water may drop to about 60-75 degrees Celsius (and preferably consume a moderate amount of energy). In the event that a user attempts to dispense hot water during the "sleep time" (or activates a pre-heat function on the coffee making device 24), a heating boost function may be deployed, whereby the heating coils activate and are provided with additional wattage to quickly heat the water to a preferred range of 93 and 96 degrees Celsius.

In the case of a dual hot tank 26,28 embodiment, during the normal/operational time periods, the wattage provided to the first hot tank 28 may range between 400-600 watts, and the wattage provided to the second hot tank 26 may have a connected load up to 1100 watts (so long as the total wattage, between the first and second hot tanks 26,28, does not exceed 1500 watts). During the "sleep time," the second hot tank 26 may be completely disconnected or, alternatively, provided with a cyclical amount of wattage (e.g., bursts of 4-60 watts every second or fraction thereof) to maintain the temperature of the water contained therein within a defined range—albeit within a range that is the same as, or cooler than, the temperature of the water during normal operational time periods. As mentioned above, in certain alternative embodiments, the heating coils for one or both of the two hot tanks 26,28 may be deactivated entirely during the "sleep time." Still further, in certain additional embodiments, the invention provides that the power-saving "sleep option" may be used to entirely deactivate the entire dispenser (i.e., all functions) during a defined period of time, i.e., remove all power provided to the cold tank and hot tank(s).

Referring to the embodiment above, whereby a hot tank may power-down during "sleep time" by receiving cyclical amounts of wattage, the invention provides that the magnitude and frequency of the wattage bursts may be adjusted in real time. For example, if the temperature of the water within a hot tank falls below a defined range, the frequency (and/or magnitude) of the supplied wattage may be increased (to heat the water); if the temperature of the water within the hot tank elevates above the defined range, the frequency (and/or magnitude) of the supplied wattage may be decreased (to allow the water to cool); and if the temperature of the water within the hot tank falls within the defined range, the frequency (and/or magnitude) of the supplied wattage will be maintained.

As mentioned above, the water dispensers of the present invention include a set of water dispensing actuator buttons 22. The water dispensing actuator buttons 22 will preferably include at least one child safety latch in at least one of the buttons (the hot water actuator button 22A). The child safety latch preferably comprises an element that is configured to be moved in a first direction (on the exterior surface of the actuator button 22), e.g., inward and towards the center of the button, which allows the actuator button to then be pushed downwards to cause hot water to be dispensed. When the child safety latch is released (and the force that moved the element in the first direction is removed), an internal spring will force the element back in a second direction, which prevents the actuator button from being pushed downwards (thereby preventing hot water from being dispensed).

According to still further embodiments, the invention provides that the dispensers may include a system for expelling any residual water that may be left behind in the coffee making device 24 (and/or the disposable cartridge included therein), after a coffee beverage is produced. More particularly, for example, the system may comprise an air pump 200 (FIGS. 9 and 10) that is configured to deliver a defined volume of air (at sufficient pressure) to expel any residual water that may be left behind in the coffee making device 24 (and/or the disposable cartridge included therein), after a coffee beverage is produced. According to certain embodiments (e.g., FIGS. 14-17), the dispenser may comprise an air pump 200, compressed air storage tank 202, and solenoid valve 206, which are configured to deliver (through an air tube) a high volume of air (at high-pressure) to the coffee making device 24 to expel residual water. The invention provides that the air storage tank 202 may comprise two openings, one for receiving air from the air pump 200 and the other being fluidly coupled to the solenoid valve 206 through the air tube (to allow the air to exist and travel to the coffee making device 24). Alternatively, both the air inlet and exit openings may be configured to co-exist within the same opening. The invention provides that the air storage tank 202 will preferably comprise a T-connection, with the solenoid valve 206 at one end and the air pump 200 at the other. The invention provides that the control board 58 may be programmed to cause the system to automatically deliver a high-pressure volume of air to the coffee making device 24, shortly after a hot beverage is produced (with the residual water (and high-pressure air) being forced out of the dispenser through the coffee outlet 56 or other vent).

More particularly, the invention provides that the air pump 200 may be instructed by the control board 58 to generate and fill the compressed air storage tank 202 with a defined volume of air. Immediately or shortly after a hot beverage is produced, the control board 58 will instruct the compressed air storage tank 202 to quickly release all air contained therein, through a solenoid valve 206 and air tube, and into the coffee making device 24 (and disposable cartridge included therein), which will be effective to force any residual water out of the coffee making device 24 (and disposable cartridge included therein), and to exit the dispenser through the coffee outlet 56 or other vent.

The invention provides that the compressed air storage tank 202 may consist of a rigid/fixed tank, with the air therein quickly exiting through the air tube when the solenoid valve 206 is opened. Alternatively, the air storage tank may be configured as an expandable rubber (or other elastomeric) bladder, which is capable of storing a defined volume of air produced by the air pump 200 and may quickly release the air contained therein when the solenoid valve 206 is opened (and the expandable bladder contracts and forces the air out and through the air tube). The invention provides that the air may be retained within the compressed air storage tank 202 (in a high-pressure state) via the solenoid valve 206 being held in a closed position, which may be temporarily opened to allow the air to quickly escape when instructed by the control board 58 to release the air following the production of a hot beverage (i.e., when the air barrier is temporarily removed, the air storage tank 202 will automatically force the air out and through the air tube 204). The invention provides that the above-described systems for expelling any residual water that may be left behind in the coffee making device 24 may be employed in both the single hot tank embodiments and dual hot tank embodiments described herein. Still further, the invention provides that the solenoid valve 206 may, alternatively, be replace with a one-way valve 203 (FIGS. 18-21), which is configured to remain closed in a resting state, but temporarily opened when the control board 58 instructs the air storage tank 202 to release the air following the production of a hot beverage).

Referring now to FIG. 23, according to further embodiments of the present invention, the water dispensers include a front door 67 that includes a drip tray 69. The drip tray 69 is preferably built into the front door 67, such that it is located beneath the external taps (which dispense water and coffee), and is integrally formed into the top portion of the front door 67 of the cabinet. This configuration has been found to increase the amount of room that is available to place a glass (or other container) beneath the external taps when receiving dispensed water or coffee, while simultaneously reducing the total height of the water dispenser (which is beneficial for shipping and retail storage purposes). In addition, the dispensers may comprise a coffee cup platform 68, which may be varied in height to accommodate different sized cups (and to preferably position the top of the cup in the proximity of the coffee tap). The invention provides that the cabinet of the water dispensers may be comprised of various materials, such as stainless steel, plastics, or other materials.

Figure 24:
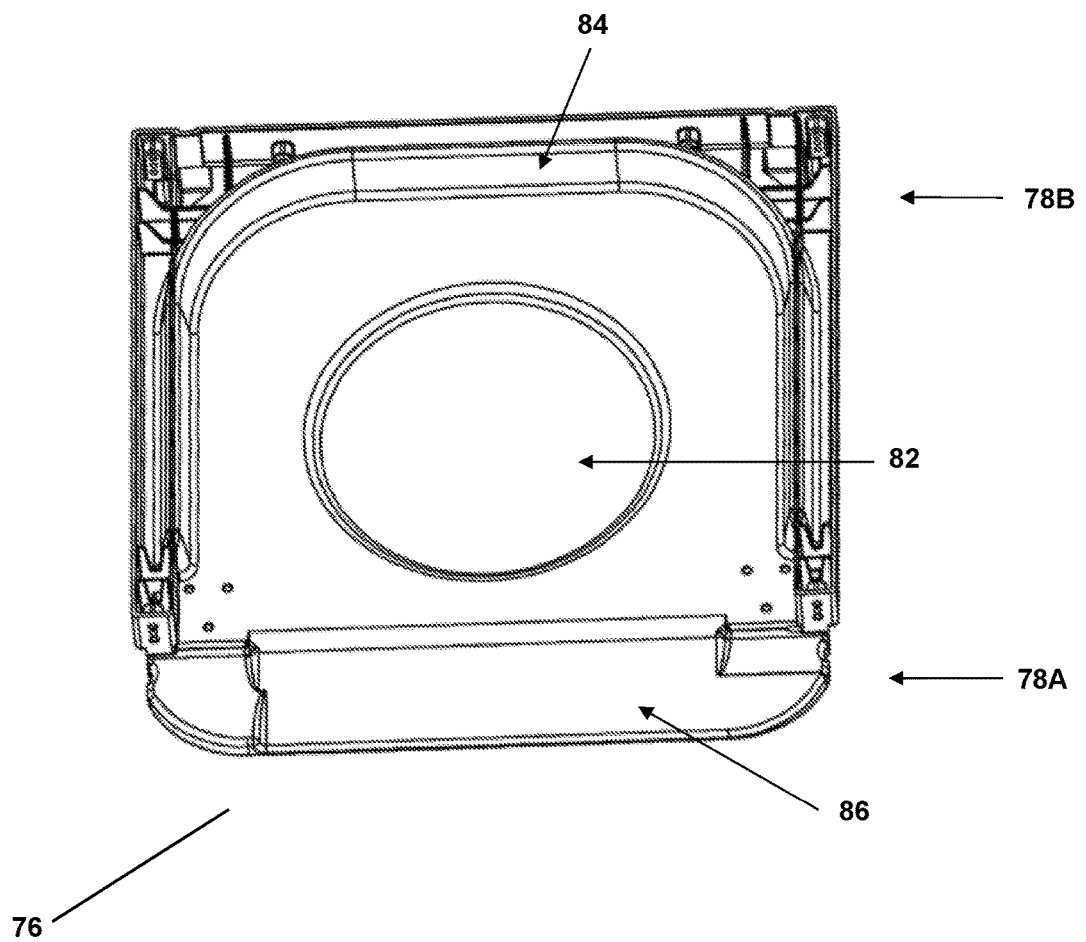
FIG. 24: A top side view of a bottle tray that is used in the water dispensers described herein.

Referring now to FIG. 24, according to certain preferred embodiments of the present invention, the dispensers further include a bottle tray 76 disposed at the bottom of the bottom half 18 of the interior portion 14 of the cabinet. The bottle tray 76 is configured to receive the bottom surface of the water bottle 20 in an upright position. Importantly, the bottle tray 76 is slanted from a front side 78A to a backside 78B of the tray 76. That is, when facing the front of the water dispenser, i.e., the side on which the actuator buttons 22 are located, the bottle tray 76 is higher at the front side 78A thereof than the backside 78B of the tray 76. The slope of the slant will preferably range from 5-30 degrees. This configuration facilitates the insertion of a full water bottle 20 into the bottom half 18 of the interior portion 14 of the cabinet (in an upright position). The invention provides that the bottle tray 76 may also comprise a recessed area 82 that is configured to receive a bottom surface of the water bottle 20. The bottle tray 76 may comprise a perimeter wall 84, which is configured to prevent the water bottle 20 from falling out of the cabinet, particularly when pressure may be injected into the water bottle to extract water therefrom. According to such embodiments, the bottle tray 76 may comprise a lip 86 that is configured to assist a user with inserting the water bottle 20 onto the bottle tray 76. Still further, according to certain alternative embodiments, the bottle tray 76 may be slidably pulled out of the cabinet and pushed back into the cabinet, e.g., through a set of wheels, ball bearings, or other sliding mechanisms. According to such embodiments, the bottle tray 76 may be temporarily pulled out from the cabinet to facilitate the placement of a water bottle 20 thereon, and pushed back into the cabinet for storage and subsequent use.

The many aspects and benefits of the invention are apparent from the detailed description, and thus, it is intended for the following claims to cover all such aspects and benefits of the invention, which fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A combined water dispenser and coffee making device, which comprises:
   (a) a cabinet having an exterior portion and an interior portion, wherein the interior portion of the cabinet is configured to house a water bottle;
   (b) a cold tank that is configured to receive water from the water bottle, which is connected to an evaporator that is configured to cool the water that is contained within the cold tank;
   (c) a hot tank that is configured to receive water from the cold tank, which is connected to a heating coil that is configured to heat the water that is contained within the hot tank;
   (d) a coffee making device located on a top side of the cabinet, wherein the coffee making device is configured to (i) receive water from the hot tank, (ii) receive a disposable cartridge that contains coffee grinds; and (iii) cause water to contact the coffee grinds to produce a coffee beverage, wherein the coffee making device comprises (A) a blunt-ended spike that is recessed within or flush with a surrounding safety wall of a lid of the dispenser that is configured to puncture a top side of the disposable cartridge and (B) a sharp-ended spike that is configured to puncture a bottom side of the disposable cartridge;
   (e) one or more taps, which are configured to dispense cold water from the cold tank; hot water from the hot tank; and coffee beverage from the coffee making device; and
   (f) an air storage tank that is configured to receive, store, and release a defined volume of air through an air tube and into the coffee making device, in order to expel residual water contained within the coffee making device after the coffee beverage is produced.

2. The water dispenser and coffee making device of claim 1, wherein the cold tank exhibits an approximately rectangular perimeter.

3. The water dispenser and coffee making device of claim 1, which further comprises a flow sensor located in-line between the cold tank and hot tank, wherein the flow sensor is configured to monitor a volume of water that flows into the hot tank.

4. The water dispenser and coffee making device of claim 1, which further comprises a drip tray, which is located beneath the cold water tap, hot water tap, and coffee tap, and is integrally formed with a top portion of a front door of the cabinet.

5. The water dispenser and coffee making device of claim 1, which further comprises a bottle tray disposed in a bottom half of the interior portion of the cabinet that is configured to receive a bottom surface of the water bottle in an upright position, wherein the bottle tray is slanted from a front side to a back side of the bottle tray.

6. The water dispenser and coffee making device of claim 1, which further comprises a power-saving program, whereby a user may operate the program through a control board to instruct the dispenser to consume less energy during a defined period of time each day, relative to an amount of energy that the dispenser consumes during all other periods of time during each day.

7. The water dispenser and coffee making device of claim 1, wherein the dispenser consumes less energy during the defined period of time each day by supplying cyclical bursts of wattage to the heating coil.

8. The water dispenser and coffee making device of claim 1, wherein the sharp-ended spike:
 (a) comprises a sharp end; a threaded end opposite of the sharp end; and a middle portion between the sharp end and threaded end that comprises one or more apertures; or
 (b) comprises a sharp end; a threaded end opposite of the sharp end; and a middle portion between the sharp end and threaded end that comprises a curved material having a cut-out region between a beginning and ending side of the curved material.

9. The water dispenser and coffee making device of claim 1, which further comprises:
 (a) a basket located in the coffee making device that is configured to receive the disposable cartridge, wherein the basket comprises a filter through which coffee beverage exits the basket; and
 (b) a lid having a child safety latch, wherein the latch comprises (i) a slide that must be pushed forwards and towards a back of the dispenser and (ii) a button that must be depressed downwards from lid, in order for the lid to open.

* * * * *